(12) United States Patent
Chang et al.

(10) Patent No.: US 10,793,038 B2
(45) Date of Patent: Oct. 6, 2020

(54) HEADREST INTEGRATED ENTERTAINMENT SYSTEM

(71) Applicant: VOXX INTERNATIONAL CORPORATION, Hauppauge, NY (US)

(72) Inventors: Arthur Chang, San Bernardino, CA (US); Chung Lung Chang, San Bernardino, CA (US)

(73) Assignee: VOXX INTERNATIONAL CORPORATION, Hauppauge, NY (US)

( * ) Notice: Subject to any disclaimer, the term of this patent is extended or adjusted under 35 U.S.C. 154(b) by 491 days.

(21) Appl. No.: 14/860,872

(22) Filed: Sep. 22, 2015

(65) Prior Publication Data

US 2017/0080876 A1 Mar. 23, 2017

(51) Int. Cl.
*B60N 2/879* (2018.01)
*B60R 11/02* (2006.01)
*B60R 11/00* (2006.01)

(52) U.S. Cl.
CPC .......... *B60N 2/879* (2018.02); *B60R 11/0235* (2013.01); *B60R 2011/0017* (2013.01)

(58) Field of Classification Search
CPC ... B60N 2/4876; B60N 2/879; B60R 11/0229; B60R 2011/0017; B60R 11/0235
(Continued)

(56) References Cited

U.S. PATENT DOCUMENTS 4,647,980 A 3/1987 Steventon et al.
4,756,528 A 7/1988 Umashankar
(Continued)

FOREIGN PATENT DOCUMENTS

CN 2712720 Y 7/2005
CN 201287383 8/2009
(Continued)

OTHER PUBLICATIONS

Claim Construction Order, U.S. District Court, Central District of California, *Johnson Safety, Inc.* (Plaintiff) v. *Voxx International Corporation; Voxx Electronics Corporation; and Invision Automotive Systems Inc.* (Defendants), Case No. 5: 14-cv-02591-ODW(DTB), Nov. 16, 2016, 36 pgs.
(Continued)

*Primary Examiner* — Milton Nelson, Jr.
(74) *Attorney, Agent, or Firm* — F. Chau & Associates, LLC

(57) ABSTRACT

In certain embodiments, a headrest-integrated entertainment system for a vehicle seat is provided. The headrest system comprises a head support unit adapted to be coupled to the seat of a vehicle; a base member adapted to be securely coupled to the head support unit; a cover panel member configured to enclosingly couple the base member to define a device compartment there-between, and a multimedia system including a display device observably retained in the device compartment. The base member and the cover panel member are securely coupled to each other through a plurality of integrally formed buckle units respectively distributed thereon. In certain embodiments, the cover panel member comprises a rearward facing panel that defines a viewing window for the display device, and a side panel that integrally extends from a lateral flank thereof. The rearward facing panel traverses substantially across a width of the head support unit.

43 Claims, 28 Drawing Sheets

(58) Field of Classification Search
USPC .................................................. 297/217.4
See application file for complete search history.

(56) References Cited

U.S. PATENT DOCUMENTS

| | | | |
|---|---|---|---|
| 4,774,514 | A | 9/1988 | Hildebrandt et al. |
| 4,866,515 | A | 9/1989 | Tagawa et al. |
| 5,267,775 | A | 12/1993 | Nguyen |
| 5,507,556 | A | 4/1996 | Dixon |
| 5,775,762 | A | 7/1998 | Vitito |
| 5,808,660 | A | 9/1998 | Sekine et al. |
| 5,946,055 | A | 8/1999 | Rosen |
| D413,856 | S | 9/1999 | Scribner |
| 6,056,248 | A | 5/2000 | Ma |
| 6,056,364 | A | 5/2000 | De Filippo |
| 6,115,086 | A | 9/2000 | Rosen |
| 6,124,902 | A | 9/2000 | Rosen |
| 6,125,030 | A | 9/2000 | Mola et al. |
| 6,157,418 | A | 12/2000 | Rosen |
| 6,177,887 | B1 | 1/2001 | Jerome |
| 6,186,459 | B1 | 2/2001 | Ma |
| 6,199,810 | B1 | 3/2001 | Wu et al. |
| 6,246,449 | B1 | 6/2001 | Rosen |
| 6,330,337 | B1 | 12/2001 | Nicholson et al. |
| 6,364,390 | B1 | 4/2002 | Finneman |
| D469,413 | S | 1/2003 | To et al. |
| 6,669,285 | B1 | 12/2003 | Park et al. |
| 6,678,892 | B1 | 1/2004 | Lavelle et al. |
| 6,698,832 | B2 | 3/2004 | Boudinot |
| 6,739,654 | B1 | 5/2004 | Shen et al. |
| 6,871,356 | B2 | 3/2005 | Chang |
| 6,928,654 | B2 | 8/2005 | Tranchina et al. |
| 7,036,879 | B2 | 5/2006 | Chang |
| 7,040,698 | B2 | 5/2006 | Park et al. |
| 7,044,546 | B2 | 5/2006 | Chang |
| 7,050,124 | B2 | 5/2006 | Schedivy |
| 7,070,237 | B2 | 7/2006 | Rochel |
| 7,084,932 | B1 | 8/2006 | Mathias et al. |
| 7,245,274 | B2 | 7/2007 | Schedivy |
| 7,267,402 | B2 | 9/2007 | Chang |
| 7,290,833 | B2 | 11/2007 | Park et al. |
| 7,354,091 | B2 | 4/2008 | Lavelle et al. |
| 7,360,833 | B2 | 4/2008 | Vitito |
| 7,379,125 | B2 | 5/2008 | Chang |
| 7,448,679 | B2 | 11/2008 | Chang |
| 7,533,452 | B1 | 5/2009 | Espina et al. |
| 7,597,393 | B1 | 10/2009 | Tuccinardi et al. |
| 7,780,231 | B2 | 8/2010 | Shalam et al. |
| 7,839,355 | B2 | 11/2010 | Lavelle et al. |
| 7,894,003 | B2 | 2/2011 | Chang |
| 7,909,396 | B2 | 3/2011 | Vitito |
| 7,909,397 | B2 | 3/2011 | Shalam et al. |
| 7,954,894 | B2 | 6/2011 | Schedivy et al. |
| 8,109,569 | B2 | 2/2012 | Mitchell |
| 8,136,777 | B2 | 3/2012 | Brawner |
| 8,162,395 | B2 | 4/2012 | Vitito |
| 8,201,203 | B2 | 6/2012 | Vitito |
| 8,585,140 | B2 | 11/2013 | Chang |
| 8,625,034 | B2 | 1/2014 | Campbell et al. |
| 8,783,767 | B2 | 7/2014 | Wood |
| 9,114,745 | B2 * | 8/2015 | Schedivy ................. B60N 2/64 |
| 2001/0011664 | A1 | 8/2001 | Meritt |
| 2003/0137584 | A1 | 7/2003 | Norvell |
| 2004/0007906 | A1 * | 1/2004 | Park .................... B60R 11/0235 |
| | | | 297/217.3 |
| 2004/0086259 | A1 | 5/2004 | Schedivy |
| 2005/0204596 | A1 | 9/2005 | Peng |
| 2007/0052618 | A1 | 3/2007 | Shalam |
| 2007/0070192 | A1 | 3/2007 | Shalam |
| 2007/0105444 | A1 | 5/2007 | Macholz |
| 2008/0157574 | A1 | 7/2008 | LaRussa |
| 2008/0165293 | A1 | 7/2008 | Tranchina |
| 2009/0167977 | A1 * | 7/2009 | Lee et al. ..................... 349/58 |
| 2012/0086247 | A1 | 4/2012 | Liu |
| 2014/0061264 | A1 | 3/2014 | Kucera |
| 2014/0217789 | A1 | 8/2014 | Chang |

FOREIGN PATENT DOCUMENTS

| | | |
|---|---|---|
| CN | 201556380 U | 8/2010 |
| DE | 102005058113 A1 * | 6/2006 |
| EP | 0976616 | 8/1999 |
| EP | 2465733 A1 | 6/2012 |
| EP | 1949364 B1 | 1/2014 |
| EP | 2156662 B1 | 4/2014 |
| JP | 6415479 | 1/1989 |
| JP | 1-94049 | 4/1989 |
| JP | 2-144242 | 6/1990 |
| JP | 2158437 | 6/1990 |
| JP | 640021 | 10/1994 |
| JP | 741401 | 9/1995 |
| JP | 11151986 | 6/1999 |
| KR | 19990027444 | 7/1999 |
| KR | 20000014983 | 7/2000 |
| KR | 200207307 | 10/2000 |
| KR | 200256470 | 12/2001 |
| TW | 483319 | 4/2002 |
| WO | 2000/38951 | 7/2000 |

OTHER PUBLICATIONS

Stipulated Constructions of Claim Terms, U.S. District Court for the Central District of California, *Johnson Safety, Inc.* (Plaintiff—Counterdefendant) v. *Voxx International Corporation; Voxx Electronics Corporation; and Invision Automotive Systems Inc.* (Defendants—Counterclaimants), Case No. 14-cv-2591-ODW (DTB), Dec. 1, 2016, 6 pgs.

Plaintiff's Opening Claim Construction Brief for Plaintiff's Patents-in-Suit, U.S. District Court for the Central District of California, *Johnson Safety, Inc.* (Plaintiff—Counterdefendant) v. *Voxx International Corporation; Voxx Electronics Corporation; and Invision Automotive Systems Inc.* (Defendants—Counterclaimants), Case No: 14-cv-2591-ODW (DTB), Jan. 8, 2016, 31 pgs.

Parties' Final Joint Claim Chart, U.S. District Court for the Central District of California, *Johnson Safety, Inc.* (Plaintiff—Counterdefendant) v. *Voxx International Corporation; Voxx Electronics Corporation; and Invision Automotive Systems Inc.* (Defendants—Counterclaimants), Case No. 5: 14-cv-02591-ODW(DTBx), Jan. 8, 2016, 6 pgs.

Parties' Proposed Constructions and Supporting Evidence for Disputed Claim Terms of the Patents in Suite, Ex. A to Final Joint Claim Chart, Case No. 5:14-cv-02591-ODW-DTB, Jan. 8, 2016, 37 pgs.

Plaintiff's Reply Claim Construction Brief for Plaintiff's Patents-in-Suit, U.S. District Court for the Central District of California, *Johnson Safety, Inc.* (Plaintiff—Counterdefendant) v. *Voxx International Corporation; Voxx Electronics Corporation; and Invision Automotive Systems Inc.* (Defendants—Counterclaimants), Case No. 14-cv-2591-ODW(DTB), Jan. 25, 2016, 18 pgs.

Plaintiff's Responsive Claim Construction Brief for Defendants' Patents-in-Suit, U.S. District Court for the Central District of California, *Johnson Safety, Inc.* (Plaintiff—Counterdefendant) v. *Voxx International Corporation; Voxx Electronics Corporation; and Invision Automotive Systems Inc.* (Defendants—Counterclaimants), Case No: 14-cv-2591-ODW (DTB), Jan. 19, 2016, 30 pgs.

Voxx's Opening Claim Construction Brief, U.S. District Court for the Central District of California, *Johnson Safety, Inc.* (Plaintiff—Counterdefendant) v. *Voxx International Corporation; Voxx Electronics Corporation; and Invision Automotive Systems Inc.* (Defendants—Counterclaimants), Case No. 5:14-cv-2591-ODW-DTB, Jan. 8, 2016, 29 pgs.

Voxx's Responsive Claim Construction Brief, U.S. District Court for the Central District of California, *Johnson Safety, Inc.* (Plaintiff) v. *Voxx International Corporation; Voxx Electronics Corporation; and Invision Automotive Systems Inc.* (Defendants), Case No. 5:14-cv-2591-ODW(DTBx, Jan. 19, 2016, 11 pgs.

Voxx's Reply to Johnson Safety's Response to Voxx's Opening Claim Construction Brief, U.S. District Court for the Central District of California, *Johnson Safety, Inc.* (Plaintiff—Counterdefendant) v. *Voxx International Corporation; Voxx Elec-

(56) References Cited

OTHER PUBLICATIONS

*tronics Corporation; and Invision Automotive Systems Inc.* (Defendants—Counterclaimants), Case No. 5:14-cv-2591-ODW-DTB, Jan. 25, 2016, 17 pgs.

Joint Appendix of Extrinsic Evidence, U.S. District Court for the Central District of California, *Johnson Safety, Inc.* (Plaintiff) v. *Voxx International Corporation; Voxx Electronics Corporation; and Invision Automotive Systems Inc.* (Defendants), Case No. 5:14-cv-02591-ODW (DTBx), Jan. 25, 2016, 4 pgs.

JSI Extrinsic Evidence: Exhibits C-H, Exhibit O, Exhibit Q, Jan. 25, 2016, Case No. 5:14-cv-02591-ODW-DTB, 74 pgs.

Voxx Extrinsic Evicence: Exhibit A, Jan. 25, 2016, Case No. 5:14-cv-02591-ODW-DTB, 15 pgs.

Petition for Inter Partes Review of U.S. Pat. No. 8,585,140 Under 35 U.S.C. 311-319 and 37 C.F.R. 42, *Voxx International Corporation* (Petitioner) v. *Johnson Safety, Inc.* (Patent Owner), U.S. Patent and Trademark Office Before the Patent Trial and Appeal Board, Dec. 30, 2016, 49 pgs.

Parties' P.R. 4-3 Joint Claim Construction and Prehearing Statement with Exhibits A.1-E.2, District Court for the Central District of California, *Johnson Safety, Inc.* (Plaintiff—Counterdefendant) v. *Voxx International Corporation; Voxx Electronics Corporation; and Invision Automotive Systems Inc.* (Defendants—Counterclaimants), Case No. 5:14-cv-02591-ODW(DTBx), Nov. 23, 2015, 98 pgs.

Voxx's Preliminary Invalidity Contentions with Exhibits A-E, U.S. District Court for the Central District of California, *Johnson Safety, Inc.* (Plaintiff) v. *Voxx International Corporation; Voxx Electronics Corporation; and Invision Automotive Systems Inc.* (Defendants), Case No. 5:14-cv-02591-ODW(DTBx), Sep. 28, 2015, 196 pgs.

Voxx International Corporation's et al. Notice of Service of Amended Invalidity Contentions, U.S. District Court for the Central District of California, *Johnson Safety, Inc.* (Plaintiff) v. *Voxx International Corporation; Voxx Electronics Corporation; and Invision Automotive Systems, Inc.* (Defendants), Case No: 5:14-cv-02591 ODW(DTB), Jan. 20, 2017, 7 pgs.

Popular Mechanics, http://popularmechanics.com, May 2000, "Digital Dreams in Sin City" by Tobey Grumet, 6 pgs.

Popular Mechanics, http://popularmechanics.com, Oct. 1999, "Desktop Theater," by Steve Ditlea, 3 pgs.

PC Magazine, www.pcmag.com, "PC Buyer's Guide", First Looks, Dec. 1, 2002, (2 total pgs.), p. 38.

PC Magazine, www.pcmag.com, "How to Network Your Home", Apr. 8, 2003, (8 total pgs.) pp. 106-112.

Audiovox Corporation, LCM56 Headrest 5.6" LCD Monitor, Owner's Manual, 2002, 12 pgs.

Audiovox, LCM-5600NP, 5.6" Active Matrix LCD Monitor, Owner's Manual, 2001, 8 pgs.

Audiovox Electronics Corp., LCM5869NP & LCM7069NP Remote Controlled Color Display Monitor, Installation and Owner's Manual, Mar. 27, 2002, 22 pgs.

Audiovox Electronics Corp., LCM5043NP & LCM5643NP Remote Controlled Color Display Monitor with Headphone Jack, Installation and Owner's Manual, Mar. 25, 2002, 20 pgs.

Audiovox, LCM-4000 4" Active Matrix LCD Monitor, Owner's Manual, 2000, 8 pgs.

Audiovox Corporation, LCM-0565 5.6" Active Matrix LCS Monitor, Owner's Manual, 2000, 8 pgs.

Audiovox Corporation, LCM-0505 5" Active Matrix LCD Monitor, Owner's Manual, 2000, 8 pgs.

Audiovox Electronics Corp., LCM500NP 5 Inch Monitor with 2 Video Input Capability, Installation and Operation Manual, 2001, 16 pgs.

Directed Video Headrest Video Monitor Owner's Manual/Installation Guide HVM500, (Publication Date Unknown).

Audiovox Corporation, LCM640 Owner's Manual and Installation Guide, (Publication Date Unknown).

Audiovox Corporation, LCM640TV Owner's Manual, Flip Down LCD In-Vehicle Television Entertainment System, (Publication Date Unknown).

\* cited by examiner

US 10,793,038 B2

HEADREST INTEGRATED ENTERTAINMENT SYSTEM

BACKGROUND OF THE INVENTIONS

1. Filed of the Inventions

This application relates to entertainment systems that can be mounted in a vehicle, such as an automobile, and more particularly relates to headrest-integrated entertainment systems for vehicles.

2. Description of the Related Art

Onboard entertainment systems for transportation vehicles are known in the art. As such, many advances have been made in the development of entertainment systems that make the otherwise tedious task of traveling in an automobile more enjoyable. For instance, overhead entertainment systems have often been employed in mass transportations for effective public broadcasting. Systems that are mounted within a headrest of an automobile have also been developed to provide a higher level of personalized enjoyment. However, known systems and various components thereof have various limitations and disadvantages.

BRIEF SUMMARY

Certain embodiments of the instant disclosure provide a headrest integrated entertainment system for a vehicle seat. The system comprises a head support unit adapted to be coupled to a seat of a vehicle; a base member adapted to be securely coupled to the head support unit; a cover panel member configured to enclosingly couple the base member to define a device compartment there-between, wherein the base member and the cover panel member are securely coupled to each other through a plurality of integrally formed buckle units respectively distributed thereon; and a multimedia system including a display device observably retained in the device compartment.

Moreover, certain embodiments of the instant disclosure provide a head support unit adapted to be coupled to a seat of a vehicle having and an entertainment module adapted to be integrally coupled thereto. The entertainment module comprises a housing unit defining a device compartment and comprising a side panel, wherein the side panel is at least partially exposed from the head support portion upon integral coupling of the entertainment module and the head support portion, and a multimedia system arranged accessibly and operably in the device compartment through the side panel. The multimedia system comprises a display device observably retained at a substantially fixed angle with respect to the housing unit.

Furthermore, certain embodiments of the instant disclosure provide a headrest integrated entertainment system that comprises: a head support unit adapted to be coupled to a seat of a vehicle; and an entertainment module adapted to be integrally coupled to the head support unit. The entertainment module comprises a housing unit defining a device compartment and comprising a side panel, and a multimedia system arranged accessibly and operably in the device compartment through the side panel. The side panel is at least partially exposed from the head support portion upon integral coupling of the entertainment module and the head support portion.

BRIEF DESCRIPTION OF THE DRAWINGS

These and other features, aspects and advantages of the inventions will be better understood with reference to embodiments illustrated in the accompanying drawings. The illustrated embodiments are not intended to define the limits or scope of the inventions.

DETAILED DESCRIPTION OF PREFERRED EMBODIMENTS

Figure 1:
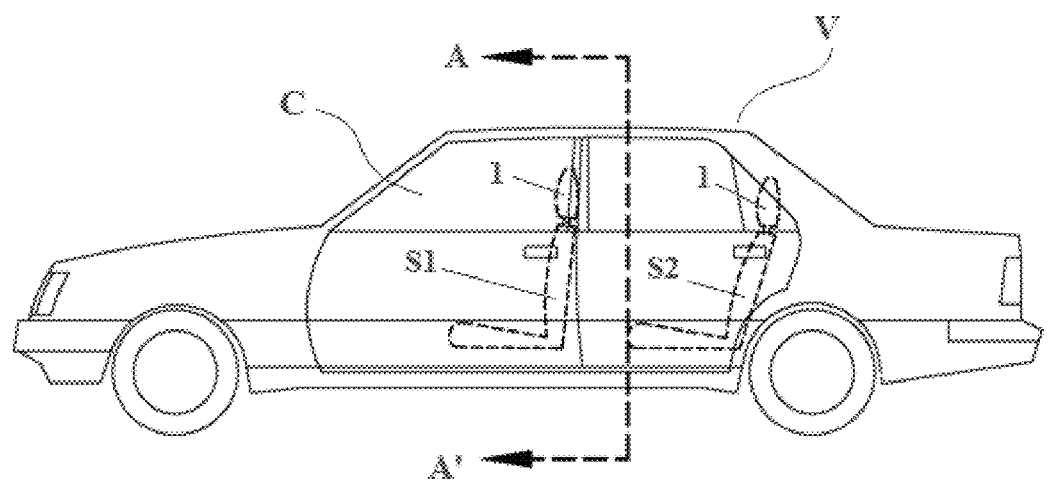
FIG. 1 is a lateral schematic view of a vehicle incorporating a headrest-integrated entertainment system in accordance with one embodiment of the instant disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

For consistency purpose and ease of understanding, like features are identified (although, in some instances, not shown) with like numerals in the exemplary figures. However, the features in different embodiments may differ in other respects, and thus shall not be narrowly confined to what is shown in the figures.

FIG. 1 is a lateral schematic view of a vehicle incorporating a headrest-integrated entertainment system in accordance with one embodiment of the instant disclosure. In the instant embodiment, a vehicle V (which takes the form of a four door sedan) is provided for illustration. The vehicle V comprises a body that defines a passenger compartment C for sheltering a vehicle operator and a plurality of passengers. Specifically, the vehicle V of the exemplary embodiment comprises two rows of seats, e.g., a row of front seat S1 and a row of back seat S2. Each of the front and back row seats may either be an independently configured, structurally separated unit, or a structurally joined, integrally connected unit. In the instant embodiment, independent units are employed in the front row of seats S1, although such an arrangement is not strictly required.

As used herein "vehicle" is a broad term and is used in its ordinary sense and may refer, without limitation, to any conveyance designed to travel on sea, land, and/or in the air. The instant disclosure pertains more particularly to powered personnel transportation devices, in which an environment for which many features and aspects of the embodiments described herein have been specially adopted. In some embodiments, the vehicle takes the form of a motorized land transportation carrier, such as a passenger automobile, a truck, a van, a mini-van, a sport-utility vehicle, etc. Nevertheless, certain features, aspects and advantages of the embodiments described herein can be used with other forms of vehicles.

Each of the seats S1/S2 may comprise a headrest unit 1 to provide enhanced comfort and safety to the occupant of the vehicle. Generally, the headrest unit 1 comprises padding/cushioning material(s), and is provided on the seat back portion of the seat S1/S2 in a substantially upright fashion. The provision of the headrest 1 provides a support surface for the head of a passenger to rest on, thus reducing stress and tension in a seat occupant's neck, particularly after boarding the vehicle for a prolonged period of time. Moreover, in the event of an accident (e.g., in a rear end collision) where a sudden surge of impulse is applied from the rear of the vehicle, the headrest 1 may function as a head restraint that prevents excessive backward travel of the occupant's head, thereby reducing the likelihood of neck injury. In some embodiments, the headrest unit 1 is provided with some degrees of adjustability. For example, the headrest mounting arrangement may incorporate mechanisms that allow height adjustment of the headrest 1 with respect to the back of the seat S1/S2. In some embodiments, the headrest mounting arrangement may incorporate mechanisms that enables angle adjustments to the headrest 1, allowing more subtle adjustments (such as tilting adjustments) with respect to the back of the seat S1/S2.

One skilled in the art will appreciate that the headrests 1 need not take any particular shape or form. For example, in one embodiment, at least one of the headrests 1 is detachably attached to the corresponding front/rear seat S1/S2. In another embodiment, at least one of the headrests 1 is integrally formed with the corresponding front/rear seat S1/S2. In other words, the headrests 1 can take many forms, generally providing the function of supporting a head of a passenger sitting in the seats S1/S2. In some embodiments, the size of at least one of the headrests 1 is sufficient to house a multimedia entertainment system that incorporates a display device, as will be discussed in more detail below.

Figure 2:
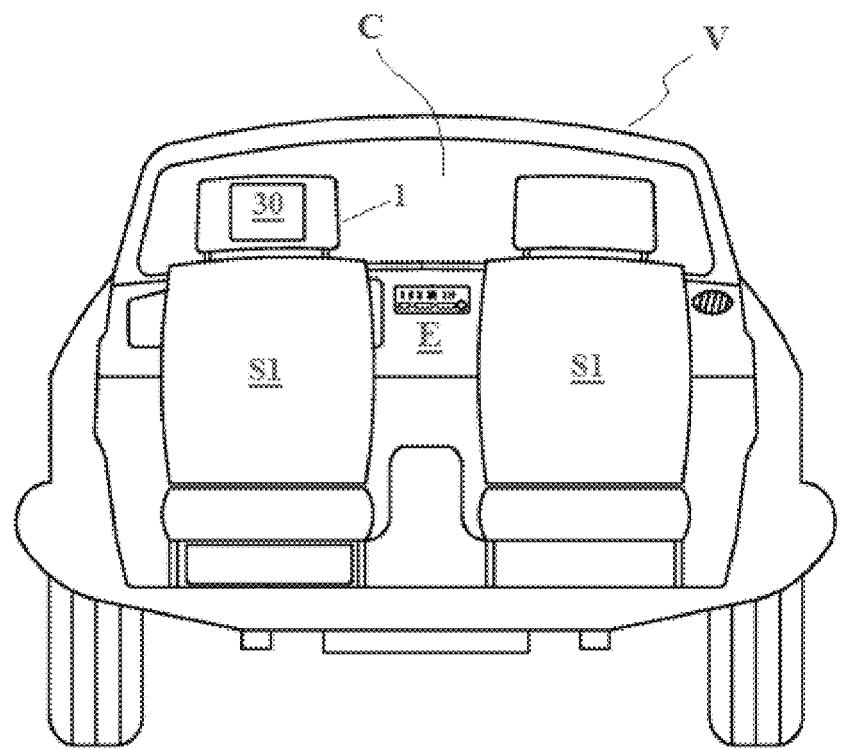
FIG. 2 is a rear schematic view of a vehicle incorporating a headrest-integrated entertainment system in accordance with one embodiment of the instant disclosure.

FIG. 2 is a rear schematic view of a vehicle incorporating a headrest-integrated entertainment system in accordance with one embodiment of the instant disclosure. Particularly, the rear schematic view is taken along the plane represented by the line A-A' as shown in FIG. 1. This particular view may closely resemble a view observed by a passenger sitting in the rear seat (e.g., seat S2) of the vehicle V.

As shown in the exemplary embodiment, the headrest 1 on the left front seat S1 comprises a headrest-integrated entertainment system in accordance with one embodiment of the instant disclosure. In the illustrative embodiment, only one headrest-integrated entertainment system is employed. However, in other applications, more than one of such systems may be provided in the vehicle compartment (e.g., providing a second of such system to the right front seat) to increase the degree of freedom in personalized entertainment. The headrest in a vehicle presents an intuitive location for mounting an entertainment system particularly due to the vehicle seating arrangement. For one thing, a back row seat (e.g., seat S2) in a passenger vehicle is often arranged substantially directly behind a front row seat (e.g., seat S1) without significant offset in placement in order to effectively utilize the limited space in the passenger compartment C. Accordingly, the headrest 1 on a front seat (e.g., S1) would inherently present itself ergonomically in front of a rear row passenger's line of sight. Therefore, an onboard entertainment system (particularly a system that incorporates visual display) mounted in the headrest may be viewed naturally with ease by a passenger boarding a rear row of the vehicle seat.

The vehicle V may comprise a dash board in the interior of the body. The dash board may incorporate a variety of vehicle onboard devices E accessibly and operably arranged therein to provide a wide range of functional controls to the onboard personnel in the passenger compartment C. Some of the onboard device E may provide multimedia/communication/entertainment associated functionalities. For instance, the onboard device E may include audio instruments to support sound recording and/or playback functions. In such an instance, the onboard device E may comprise an audio source and other audio-related hardware, such as speakers and/or microphones, to enable such audio-associated capabilities. The onboard device E may also include visual display instruments, such as an in-dash video display unit and a video source, to support functions such as graphical GPS navigation, real-time dash-camcorder playback, reverse camera display, and entertainment/video playback. In some applications, the vehicle onboard device E and the headrest-integrated entertainment system in accordance with the instant disclosure may be integrated to provide expanded/combined capabilities through physical and/or wireless connections.

The audio and video sources may cooperatively operate as an integrated source to provide audiovisual signals for multimedia broadcast/playback. The terms "video source" and "audio source" are broad terms that are used in their ordinary sense and refer, without limitation, to any device that generates an audio/visual signal that includes a video portion that can be processed to produce a video signal (e.g., to produce a visual image) and an audio portion that can be processed to produce an audio signal (e.g., sound at a level high enough to be heard by a human ear). For example, "video source" and "audio source" are broad enough to cover a digital video-disc player, a video cassette player, a video-game console, and a computer that can generate audiovisual signals, etc. Thus, the video/audio sources are described herein as generating or providing an audiovisual signal.

Figure 3B:
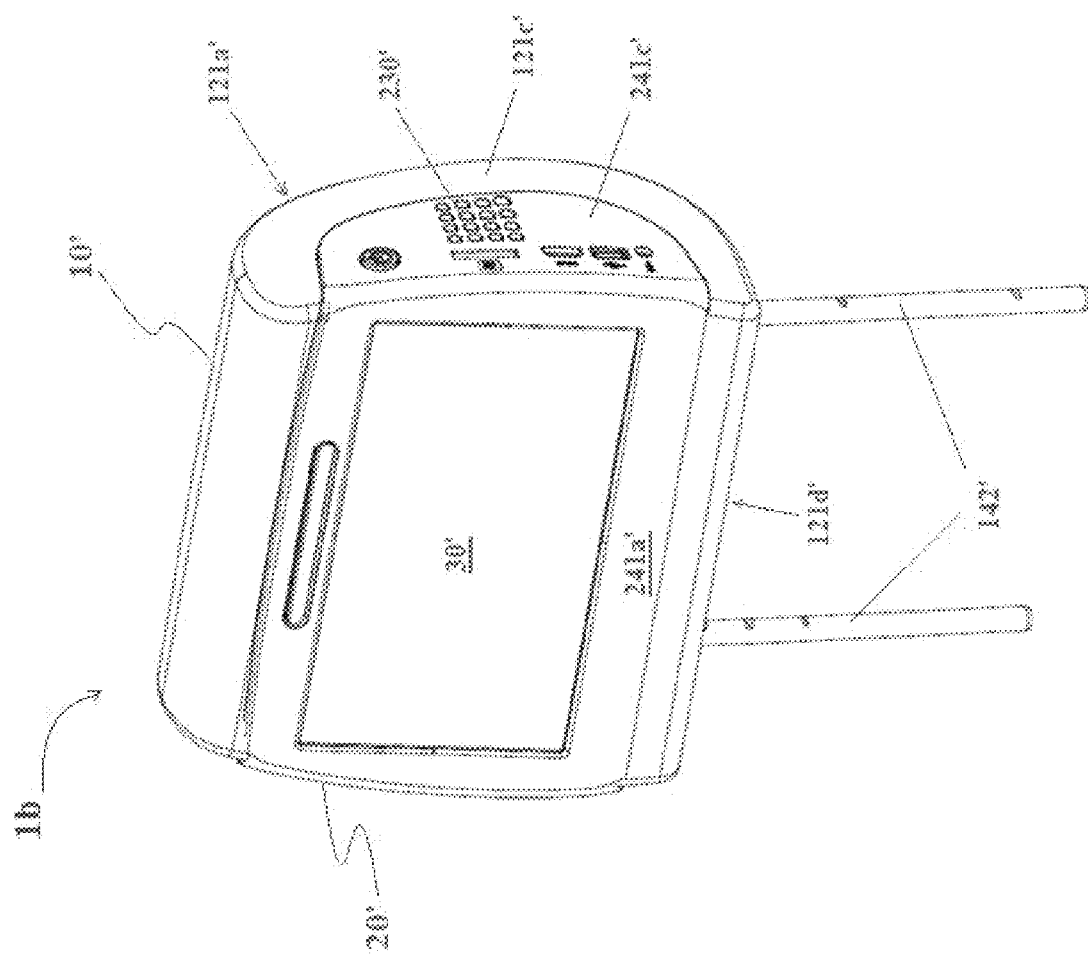
FIGS. 3A-3B are isometric illustrations of embodiments of the headrest-integrated entertainment system in accordance with the instant disclosure.
Figure 3A:
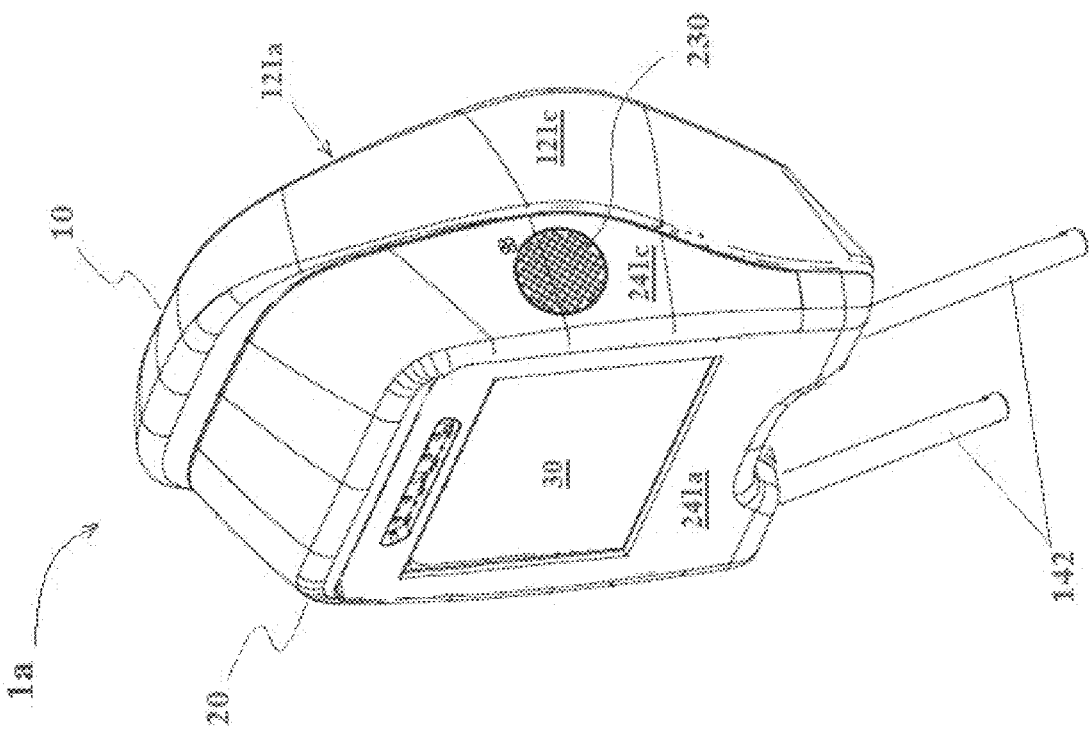

FIGS. 3A-3B are isometric illustrations of embodiments of the headrest-integrated entertainment system in accordance with the instant disclosure.

Specifically, FIG. 3A illustrates an exemplary headrest-integrated entertainment system 1a (interchangeably referred to as the "headrest system 1a"). The headrest system 1a comprises a head support unit 10 adapted to be coupled to a seat of a vehicle (e.g., the front seat S1). In the instant example, the head support unit 10 comprises a pair of mounting posts 142 configured to be mounted on a pair of corresponding mounting holes on the back of the vehicle seat. The mounting post 142 may be provided with one or more positioning slots at predetermined locations alone the length (e.g., the longitudinal axis) thereof, configured to cooperate with associated retaining mechanisms in the seat back to enable headrest height adjustments. The headrest system 1a further comprises an entertainment module integrally coupled to the head support unit 10. The entertainment module comprises a housing unit 20 that generally defines a device compartment therein, and a multimedia system 30 having a display device observably retained in the device compartment of the housing unit 20.

Adopting the orientation observed by a passenger on the vehicle seat (e.g., the front seat S1), the head support unit 10 may provide a pillow portion that generally defines a plurality of major surfaces, e.g., a head support surface 121a, an upward facing surface 121b, and a pair of lateral side surfaces 121c. Visible from the instant figure, the head support surface 121a faces substantially toward a frontal direction of the seat, and is configured to provide support for the head (and sometimes, the neck as well) of a boarded personnel. The upward-facing surface 121b and the lateral side surfaces 121c integrally extend from the head support surface 121a from the top and the sides, respectively. In some arrangements, the pillow portion of the head support unit 10 may include intermediate surface extending between the major surfaces. The intermediate surface may be curved or flat, e.g., radiused or chamfered. In most embodiments, the pillow portion of the head support unit 10 comprises padded, impact absorbing materials. In some embodiments, a fabric member (not specifically labeled) tailored to sleevingly cover the pillow portion of the head support unit 10 may be provided. In such case, the head support surface 121a, the upward-facing surface 121b, and the lateral side surface 121c may be defined on the contiguously connected external surfaces of the fabric member, and thus the physical boarder lines there-between may not always be clearly distinguishable.

The housing unit 20 of the headrest system 1a, which is configured to be integrally coupled to the head support portion 10, generally defines a plurality of major panel surfaces. The major panel surfaces include a rearward facing panel 241a and a plurality of exposed peripheral panel surfaces extending there—from, such as a pair of side panels 241c (only the right side panel is visible in FIG. 3A). Compared to the external add-on arrangements such as taught by related arts U.S. Pat. No. 8,136,777 and U.S. Pat. App. No. 2014/0061264, the integral coupling arrangement of the instant embodiment offers a structurally unitary design that may enhance the overall aesthetic appeal and space utilization of the system at the same time promotes safety to the passenger, as the external add-on unit of the related arts may present an protruding obstruction that poses increased hazards to a personnel riding behind a vehicle seat.

The rearward facing panel 241a is configured to face generally toward the back of a seat on which the headrest system 1a is mounted, arranged to be conveniently viewable by a passenger riding in a seat positioned there-behind. The rearward facing panel 241a defines a viewing window that allows visual exposure of at least a portion of the multimedia system 30. Particularly, the viewing window is configured to allow visual access to a display unit (e.g., a display screen) of the multimedia system 30. In some embodiments, the viewing window in the rearward facing panel 241a comprises a hollow/void structure that physically exposes the display unit of the multimedia system 30 there-through. Such an arrangement is particularly applicable for display units having touch-sensing capabilities. For one thing, the structural exposure of such setup allows physical contact of a passenger's finger(s) to establish physical contact with the touch sensitive display unit, thereby enabling direct on-screen tactile control of the system. In some embodiments, the viewing window in the rearward facing panel 241a comprises a transparent laminate that allows visual exposure of the display unit of the multimedia system 30. The hardness/rigidity of the transparent laminate may vary depending on applications, but is generally robust enough to offer protection to the underlying display unit yet sufficiently flexile so as not to pose significant safety hazards in the event of an impact accident.

In the exemplary headrest system 1a, the rearward facing panel 241a is designed with a wide lateral profile that traverses substantially the width of the head support unit 10. Compared to the discreet cavity-embedded arrangements such as taught by related arts U.S. Pat. Nos. 7,290,833 and 7,360,833, the revealing design of the integrally coupled housing unit 20 in accordance with the instant disclosure provides a considerably wider lateral profile for the rearward facing panel 241a. In a vehicle headrest where space is scarce, the wide lateral profile of the rearward facing panel 241a enables the utilization of a wider/bigger display unit in the housing unit 20. Such a wide lateral profile is particularly suitable for accommodating popular modern high aspect ratio widescreen displays (e.g., of ratios 16:9, 21:9, or above), while display units of retrospect configurations may also be adapted, depending on specific application requirements.

In the instant embodiment, both the left and the right side panels (only the right side panel is viewable from FIG. 3A) 241c are exposedly arranged from the head support unit 10 and externally accessible to a vehicle passenger. The side panel 241c of the housing unit 20 extends integrally from the rearward facing panel 241a toward the forward direction of the seat, and is structurally configured to meet the side lateral side surface 121c of the head support unit 10. In some embodiment, the rearward facing panel 241a and the side panel 241c of the cover panel member are formed as an integral construction. Such cover panel member may be economically made from a single piece of molded plastic. In other embodiments, separated pieces of panel parts may be designed to form the cover panel member upon assembly. Regardless of construction, the side panel 241c is arranged at least partially exposed from the head support unit 10.

In the instant example, the overall external surface contour of the side panel 241c is generally configured to conformally match that of the lateral side surface 121c of the head support unit 10. Specifically, the side panel 241c of the housing unit 20 and the lateral side surface 121c of the head support unit 10 cooperatively defines a substantially integral lateral headrest surface, e.g., wherein the joining interface between the side panel 241c and the lateral side surface 121c are configured to be substantially unitary without significant structural protrusion/recession, interruption and/or discontinuation. In some embodiments, the joining border between the side surface 121c and the side panel 241c are configured to be substantially flush, e.g., the lateral surfaces (e.g., the external surfaces defined by 121c and 241c) are configured to be substantially smooth and contiguous with respect to each other. In some embodiments, the seam line between the side surface 121c and the side panel 241c may be identifiable through visual observation yet not particularly abrupt by touch. While a completely flush and conformal arrangement between the side panel 241c and the lateral side surface 121c is not mandatory, the joining interface is rounded to touch and sufficiently smooth to prevent scratch and cut to a passenger's hands. The substantially integral headrest surface cooperatively defined by the lateral surfaces of the head support unit 10 and the housing unit 20 contributes both to aesthetic unity of the headrest system 1a and the operational safety, as the smooth/rounded joining interface there-between tend to pose less hazard concerns to passengers in both the front and the back of the seat in the time of an accident.

The side panel 241c may provide a convenient location for housing a variety of device features 230 for easy access. For example, the exemplary headrest system 1a comprises a ventilation duct exposedly arranged on the right side panel 241c to facilitate air circulation there-through, thus inducing effective cooling for the electronic components of the multimedia system 30. In addition, a media loading port, e.g., a Digital Video Disk (DVD) disc loading port is provided on the left side panel to enable easy disc swapping (not visible from instant viewing angle). A variety of additional features may be incorporated on either of the right and left side panels 241c to provide enhanced accessibility and operability of the headrest system. In some embodiments, the side panel 241c may be provided with one or more control surface, through which functions of the multimedia system 30 may be accessed and controlled.

The exemplary headrest system 1a utilizes a fixed, non-pivotal mounting arrangement for the display unit of the multimedia system 30. In some embodiments, a wide-viewing angle display device is incorporated in the multimedia system 30. Modern wide angle display devices may incorporate sophisticated features such as glare reduction and auto-brightness adjustment, thus alleviating the need for pivotal/angle adjustments. The fixed mounting arrangement of the display unit generally provides mechanical simplicity, which may translate to enhanced cost-effectiveness in terms of manufacture, assembly, and service/repair of the system. In addition, simpler mechanical arrangement contributes to overall weight reduction for a vehicle mounted device. A light weight, structurally simple mechanical setup of the headrest system 1a may also offer higher degree of safety in time of an accident, as a fixedly mounted display unit generally does not change its orientation with respect to the headrest housing even upon impact/collision, thus will not be accidentally thrown into a protruding/deployed configuration that may pose potential harm to a vehicle passenger. Moreover, a fixed-angle mounting arrangement may be particularly suitable for a touch sensitive display device, as the relative position/orientation of the display device with respect to the headrest unit is retained to ensure a secured/predictable finger operation on the surface of the display screen.

FIG. 3B illustrates an exemplary headrest-integrated entertainment system 1b (interchangeably referred to as the "headrest system 1b"). The headrest system 1b comprises a head support unit 10' adapted to be coupled to a seat of a vehicle (e.g., the front seat S1). In the instant example, the head support unit 10' comprises a pair of mounting posts 142' configured to be mounted on a pair of corresponding mounting holes on the back of the vehicle seat. The mounting post 142' may be provided with one or more positioning slots (not specifically labeled) at predetermined locations alone the length (e.g., the longitudinal axis) thereof, configured to cooperate with associated retaining mechanisms in the seat back to enable headrest height adjustments. The headrest system 1b further comprises an entertainment module integrally coupled to the head support unit 10'. The entertainment module comprises a housing unit 20' that generally defines a device compartment therein, and a multimedia system 30' having a display device observably retained in the device compartment of the housing unit 20'. As the exemplary headrest system 1b shares some similarities with that of the previous embodiment, repetitive discussion on comparable features may not be warranted for the brevity of disclosure.

Adopting the orientation observed by a passenger on the vehicle seat (e.g., the front seat S1), the head support unit 10' may provide a pillow portion that generally defines a plurality of major surfaces, e.g., a head support surface 121a', a upward facing surface 121b', a lateral side surfaces 121c', and a downward facing surface 121d'. The head support surface 121a' generally faces toward a frontal direction of the seat, and is configured to provide support for the head of a boarded passenger. The upward-facing surface 121b', the lateral side surface 121c', and the downward facing surface 121d' integrally extend from the periphery of the head support surface 121a', respectively. In some arrangements, the pillow portion of the head support unit 10' may include intermediate surface extending between the major surfaces. In some embodiments, a fabric member (not specifically labeled) tailored to sleevingly cover the pillow portion of the head support unit 10' may be provided. In such case, the head support surface 121a', the upward/downward facing surfaces 121b'/121d', and the lateral side surface 121c' may be defined on the contiguously connected external surfaces of the fabric member, and thus the physical boarder lines there-between may not always be clearly distinguishable.

The housing unit 20' of the headrest system 1b generally defines a plurality of major panel surfaces, and is configured to be integrally coupled to the head support portion 10'. The major panel surfaces includes a rearward facing panel 241a' and a pair of exposed side panels 241c' (only the right side panel is visible in the instant figure). The rearward facing panel 241a' is configured to face generally toward the back of a seat on which the headrest system 1b is mounted, and is arranged to be conveniently viewable by a passenger riding in a seat positioned there-behind. The rearward facing panel 241a' defines a viewing window that allows visual exposure of at least a portion of the multimedia system 30' there—from (e.g., the screen of a display unit). As depicted in the previous example, the viewing window may comprise either a hollow/void structure that physically exposes the display unit or a transparent laminate to provide enhanced protection there—for. The hardness/rigidity of the transparent laminate may vary depending on applications, but is generally robust enough to offer protection to the underlying display unit yet sufficiently flexile so as not to pose significant safety hazards in the event of an impact accident.

Similar to the previous example, the rearward facing panel 241a' of the headrest system 1b is designed with a wide lateral profile that traverses substantially across a width of the head support unit 10'. The laterally spanning design of the housing unit 20' in accordance with the instant disclosure provides a considerably wider horizontal profile for the rearward facing panel 241a'. As previously mentioned, the wide lateral profile of the rearward facing panel 241a' enables the utilization of a wider/bigger display unit in the housing unit 20'.

In the instant embodiment, both the left and the right side panels (only the right side panel is viewable from FIG. 3B) 241c' are exposedly arranged from the head support unit 10' and externally accessible to a vehicle passenger. The side panel 241c' of the housing unit 20' extends integrally from the rearward facing panel 241a' toward the forward direction of the seat, and is structurally configured to meet the side lateral side surface 121c' of the head support unit 10'. The rearward facing panel 241a' and the side panel 241c' may be integrally formed on a single-piece cover panel member or jointly assembled from separated pieces of panel parts. Regardless of construction, the side panel 241c' is arranged at least partially exposed from the head support unit 10'.

Compared to the protruding/revealing configuration of the multimedia housing in headrest system 1a, the housing unit 20 of the headrest system 1b incorporates a relatively concealed/recessed design, in which a top/bottom surface of the housing unit 10' is respectively wrapped/covered by the head support unit 10'. Nevertheless, the overall external surface contour of the side panel 241c' is configured to substantially conformally match that of the lateral side surface 121c' of the head support unit 10'. For instance, the pillow portion of the head support unit 10 defines a recess structure that faces substantially toward the rear side of a seat on which it is mounted. Particularly, the lateral side surface 121c' of the head support unit 10' comprises substantially a crescent profile having a concavity that faces generally toward the rear side of the seat. Correspondingly, the side panel 241c' of the head support portion 10' comprises substantially a forward facing convex profile configured to generally match the concavity of the lateral side surface 121c', thereby cooperatively defining a substantially integral lateral headrest surface, e.g., wherein the joining interface between the side panel 241c' and the lateral side surface 121c' are configured to be substantially unitary without significant structural protrusion/recession, and/or interruption.

In the exemplary headrest system 1b, the joining boarder between the side surface 121c' and the side panel 241c' are configured to be substantially flush, e.g., the lateral surfaces are configured to be substantially smooth and contiguous with respect to each other. In some embodiments, the seam line between the side surface 121c' and the side panel 241c' may be identifiable through visual observation yet not particularly abrupt by touch. While a completely flush and conformal arrangement between the side panel 241c' and the lateral side surface 121c' is not necessary, the joining interface there-between is rounded to touch and sufficiently smooth to prevent scratch and cut to a passenger's hands. Generally, regardless of the protruding/revealing configuration shown in FIG. 3A or the concealed/recessed design shown in FIG. 3B, the side panel of the housing unit is accessibly exposed, and its profile is configured to be substantially conformal with the overall shape/contour of the head support unit. The substantially integral surface fitment between the lateral surfaces of the head support unit 10' and the housing unit 20' contributes both to aesthetic unity of the headrest system 1b and the operational safety thereof, as the smooth/rounded joining line there-between tend to pose less hazard concerns to passengers in both the front and the back of the seat in the time of an accident.

The side panel 241c' of the exemplary headrest system 1b comprises additional device features 230' arranged thereon. For example, as shown in FIG. 3B, the control interface includes, from top to bottom, a system power bottom, several storage/media access ports of different formats, and an earphone connection jack (not specifically labeled in FIG. 3B for better picture visibility). In addition, the exemplary headrest system 1b also comprises a ventilation duct exposedly arranged on the right side panel 241c to facilitate air circulation there-through, thus inducing effective cooling for the electronic components of the multimedia system 30'. Nevertheless, other ventilation arrangements may be adopted to suit the particular needs of different applications, and will be discussed in further detail in a later section. Moreover, an additional media loading port, e.g., a Digital Video Disk (DVD) disc loading port, is provided on the left side panel (not visible) to enable easy disc swapping.

Similarly, the exemplary headrest system 1b also utilizes a fixed, non-pivotal mounting arrangement for the display unit of the multimedia system 30'. As mentioned previously, the fixed mounting arrangement of the display unit generally provides mechanical simplicity, which may translate to enhanced cost-effectiveness in terms of manufacture, assembly, and service/repair of the system. The simpler mechanical arrangement may also contribute to overall weight reduction for a vehicle mounted device and offer higher degree of safety in time of an accident, as a fixedly mounted display unit generally does not change its orientation with respect to the headrest housing even upon impact/collision, thus will not be accidentally thrown into a protruding/deployed configuration that may pose potential harm to a vehicle passenger. In addition, a fixed-angle mounting arrangement may be particularly suitable for a touch sensitive display device, as the relative position/orientation of the display device with respect to the headrest unit is retained to ensure a secured/predictable finger operation on the surface of the display screen.

A touch-sensitive display unit provides an intuitive human-machine interface that allows parts of a human body (typically fingers) to be used as input tools to perform gesture operations. However, while being intuitive and convenient, touch-screen operations predominately relies on visual feedback from the display screen, as the generally flat and smooth screen surface of the touch-sensitive display unit often generates little tactile feedback to a user, as opposed to a conventional user interface such as a key board/pad. The lack of tactile feedback is sometimes frustrating to a user who relies on haptic memory for rapid machine interaction. Accordingly, in some embodiments, additional control interfaces, such as display-related adjustments, audio-related adjustments, signal source selection adjustments, media ejection keys, other functional hot keys, and/or a combination thereof are further incorporated at intuitive locations on the side panel 241c' to complement the touch-sensitive display unit. The additional control interfaces accessibly arranged on the side paly 241c may be configured to perform overlapping or stand-along functionalities with respective to that provided by the touch-sensitive display device, depending on specific application requirements and/or operational needs.

Figure 4:
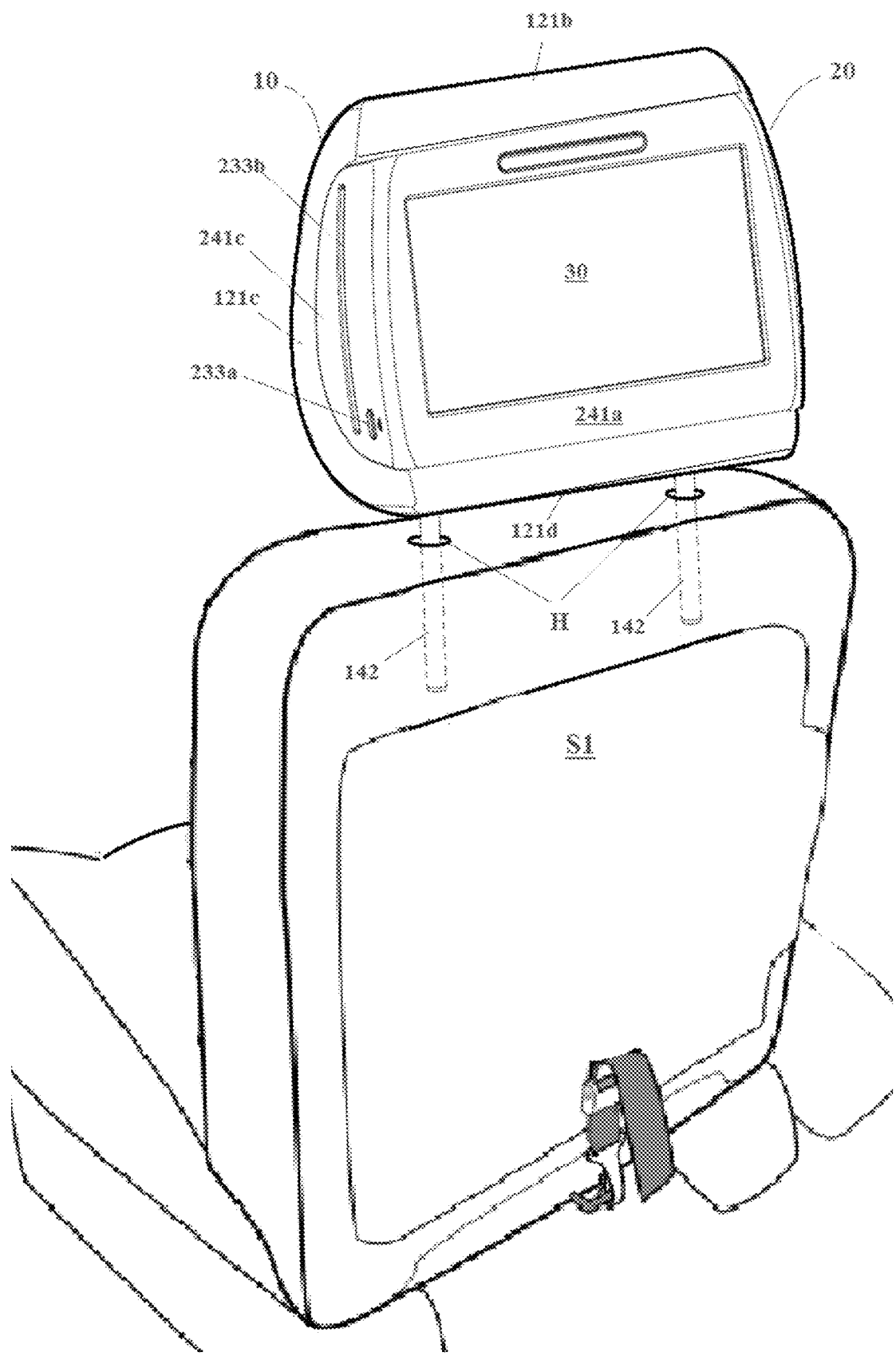
FIG. 4 is an isometric rear-left view of a headrest-integrated entertainment system in accordance with one embodiment of the instant disclosure.

FIG. 4 is an isometric rear-left view of a headrest-integrated entertainment system in accordance with one embodiment of the instant disclosure. Particularly, the ensuing discussion utilizes the exemplary headrest system 1b shown in FIG. 3B as example for further detailed depictions. For consistency purpose and ease of understanding, like features are identified with like numerals in the following exemplary figures.

The exemplary headrest system comprising the head support unit 10 is shown to be coupled to a seat of a vehicle (e.g., seat S1). The head support unit 10 comprises a pillow portion that generally defines a head support surface (not directly visible in the instant figure) configured to face toward a frontal direction of the seat, a upward facing surface 121b, a pair of lateral side surfaces 121c (only the left side surface is visible), and a downward facing surface 121d. The above-mentioned surfaces may be integrally connected to one another. In some arrangements, the pillow portion of the head support unit 10 may include intermediate surface extending between the major surfaces. The intermediate surface may be curved or flat, e.g., radiused or chamfered. In certain embodiments, the pillow portion of the head support unit 10 comprises padded, impact absorbing materials.

The head support unit 10 utilizes at least one mounting posts 142 that extends between the head support unit 10 and the back of the seat S1 to which the headrest system can be mounted. In the illustrated embodiment, the head support unit 10 includes two mounting posts 142 respectively configured to couple the seat back through a pair of correspondingly arranged mounting holes H. The mounting post 142 arrangement facilitates height adjustability of the headrest entertainment system with respect to the back of the seat S1. The height adjustment can be combined with additional modes of adjustability, such as tilting of the head support portion 10 of the headrest entertainment system.

Each of the mounting posts 142 can be solid or hollow and can be configured to convey signals from or to the headrest-integrated entertainment system. In some embodiments where two or more mounting posts 142 are provided, at least one of the posts is hollow with a passage extending therethrough. The passage defined in the hollow mounting post allows at least a portion of a cable to/from the headrest system to be arranged therein. In some embodiments, the size of the passage can be enlarged by reducing the thickness of a wall of the mounting posts 142. The housing unit 20 that defines a device compartment is substantially integrally coupled to the head support unit 10. The multimedia system 30 is accessibly and operably arranged in the device compartment of the housing unit 20. Particularly, the multimedia system 30 comprises a display unit observably mounted in the housing unit 20.

In some embodiments, the multimedia system 30 of the headrest-integrated entertainment system includes an onboard signal source (not directly visible in the instant figure) mounted in the housing unit 20. In other embodiments, a signal source is located elsewhere within the vehicle. In certain embodiments, the headrest entertainment system includes multiple signal sources, one or more of which can be mounted in the headrest and one or more of which can be located elsewhere in the vehicle. In other embodiments, multiple entertainment systems can be provided in multiple headrests. In further embodiments, multiple entertainment systems and multiple signal sources can be interactively provided through wired and/or wireless arrangements in manners depicted in U.S. Pat. No. 6,871,356, which is hereby expressly incorporated by reference herein. The signal source can be any device that receives a form of media, via either wired or wireless arrangements, and produces a signal at least partially displayable on the display unit of the multimedia system 30. For example, the signal source may be wireless equipment such as a TV tuner, a radio transceiver, a LTE (Long-Term Evolution) supported Nth generation communication device, a mobile Wi-Fi device, or other comparable devices. The signal source may also include onboard wire-connected media equipment such as a DVD reader, memory card reader, a MP3 player, or other similar device.

Particularly, FIG. 4 shows a media loading port (e.g., the DVD loading port 233b) provided on the left side panel 241c to enable easy disc swapping. As will be further discussed, a variety of additional features may be incorporated on either of the right and left side panels 241c to provide enhanced accessibility and operability of the headrest system. For instance, a disc ejection control (e.g., ejection bottom 233a) is provided on the left side control panel 241c adjacent the DVD loading portion 233b. In some embodiments, the side panel 241c may be provided with one or more control surface, through which functions of the multimedia system 30 may be accessed and controlled.

Figure 5:
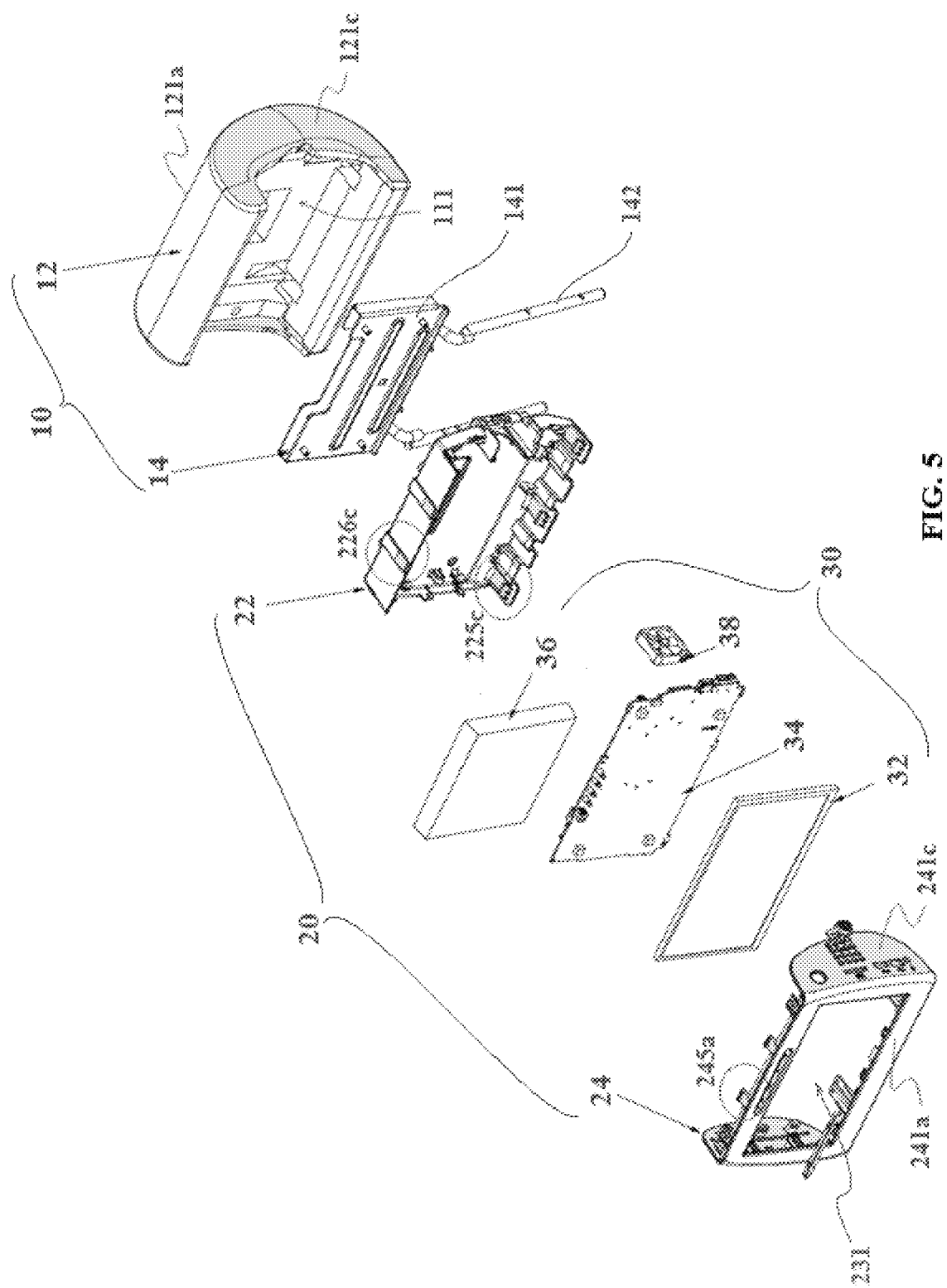
FIG. 5 is an explosive diagram illustrating components of a headrest-integrated entertainment system in accordance with one embodiment of the instant disclosure.

FIG. 5 is an explosive diagram illustrating components of a headrest-integrated entertainment system in accordance with one embodiment of the instant disclosure. Specifically, the exemplary headrest-integrated entertainment system comprises a head support unit 10 adapted to be coupled to a seat of a vehicle. The head support unit 10 includes a pillow portion 12 and a support portion 14.

As mentioned previously, the pillow portion 12 typically comprises impact-absorbing padded materials and defines a plurality of integrally connected surfaces (e.g., the head support surface 121a and the lateral side surfaces 121c) and is configured to provide physical support for the head of a passenger. On the other hand, the support portion 14 generally comprises a structurally rigid frame structure that includes a mounting bracket portion 141 and at least one mounting posts 142. Particularly, the instant exemplary pillow portion 12 comprises a recess structure 111 in which a recess cavity is formed substantially facing toward the rear side of the seat. The support portion 14 is configured to be coupled to the pillow portion 12 and to provide a rigid structural back bone for the headrest system. Particularly, the mounting bracket portion 141 of the exemplary support portion 14 is configured to be mounted substantially in the recess structure 111 of the pillow portion 12, so that the rigid body thereof may be substantially encapsulated by the padded materials of the pillow portion 12 to ensure safety to the passenger. The support portion 14 further comprises a pair of mounting posts 142 extending substantially downward from the mounting bracket portion 141. The downward facing surface of the pillow portion 12 (e.g., surface 121d as shown in FIG. 4) may be correspondingly provided with one or more mounting post apertures positioned to allow the insertion of the mounting posts 142 there-through. As previously discussed, each of the mounting post 142 provides a mounting interface with the vehicle seat. The mounting arrangement of the mounting post 142 may be configured to enable headrest orientation adjustment, e.g., height and/or tilting angle adjustments.

The separate provision of the pillow portion 12 and the support portion 14 may facilitate the ease of manufacturing. Particularly, as the soft, shock-absorbing nature of the pillow portion 12 generally contrasts the strong, rigid supportive nature required by the support portion 14, it may be practically viable to offer them as separate components of an head support assembly. For instance, the pillow portion 12 may comprise padded, impact-absorbing materials made in any suitable fashion, e.g., by molding. On the other hand, the rigid support portion 14 may be made of rigid materials such as metals and/or carbon composites, whose construction may include stamping, casting, welding and/or other suitable processes. By being separate and discrete components of the head support unit 10, each of the individual parts can be shipped, stored, serviced, and replaced separately from the other components of the assembly. However, the structurally separate arrangement is not mandatory, as some embodiments may utilize a substantially integral and unitary arrangement for the head support unit 10. A variety of suitable coupling arrangements may be adopted to achieve secure coupling between the pillow portion 12 and the support portion 14, which may include techniques such as using screws and bolts, hooks and slots, conformal shaping/pressing fitment, and insertion/over molding.

The headrest system further comprises a housing unit 20 configured to be integrally coupled to the head support unit 10 and to house the components of a multimedia system 30. Particularly, the exemplary housing unit 10 includes a base member 22 adapted to be securely coupled to the mounting bracket portion 141 of the head support unit 10 and a cover panel member 24 configured to enclosingly couple the base member 22 to define a device compartment there-between. The exemplary base member 22 comprises a structural arrangement that resembles a shallow tray. The shallow tray body thereof defines a rearward facing cavity for housing components of a multimedia system 30. The cover panel member 24 is configured to cooperatively define a device compartment for receiving at least a portion of the multimedia system 30 upon coupling with the base member 22.

The components of the housing unit 10 can be formed of any suitable material. In some embodiments, the housing unit 20 comprises a substantially rigid material capable of providing structural shielding for the components of the multimedia system 30 received therein and/or to which a fabric member (not shown) of the head support unit 10 can be attached. In some embodiments, the housing unit 20 comprises plastic. In further embodiments, the housing unit 20 comprises a plastic (or a composite plastic) that is capable of providing rigid support, yet is relatively flexible or pliable. In some embodiments, the plastic can be substantially resistant to shattering, shearing, tearing, or otherwise permanently deforming in the event of a vehicle collision, yet, in the unlikely event that such deformations should occur, the plastic can deform in a manner that results in few, if any, sharp or jagged edges. Accordingly, in the event that a housing unit 20 does shear or tear in a collision, the plastic can produce one or more edges that are relatively unlikely to cut an vehicle occupant.

In some embodiments, the housing unit 20 comprises a composite plastic that includes acrylonitrile butadiene styrene plastic (ABS plastic) and polycarbonate plastic (PC plastic). In various embodiments, the composite plastic comprises between about 40 percent and about 90 percent ABS plastic and between about 10 percent and about 60 percent PC plastic, between about 50 percent and about 80 percent ABS plastic and between about 20 percent and about 50 percent PC plastic, between about 60 percent and about 80 percent ABS plastic and between about 20 percent and about 40 percent ABS plastic, or between about 65 percent and about 75 percent ABS plastic and about 25 percent and about 35 percent PC plastic. In further embodiments, the composite plastic comprises no less than about 40 percent, about 50 percent, about 60 percent, about 70 percent, or about 80 percent ABS plastic and comprises no more than about 60 percent, about 50 percent, about 40 percent, about 30 percent, or about 20 percent PC plastic. In some embodiments, the composite plastic comprises about 70 percent ABS plastic and about 30 percent PC plastic. Other combinations of ABS and PC plastic are possible. Furthermore, other plastics may also be included and/or may replace one or more of the ABS and PC plastic. Additives may also be included with the composite plastic. Still further compositions may be suitably applied.

In some embodiments, the housing unit 20 is mounted to the head support portion 10 through suitable retaining mechanisms arranged on a back surface of the base member 22. As will be further discussed, the forward-facing surface of the base member 22 (e.g., the back surface of the shallow tray body thereof) may be provided with suitable structures/mechanisms correspondingly configured to facilitate secure structural coupling with the backward-facing surface of the mounting bracket portion 141. In some embodiments, the base member 22 is configured to be received at least partially in the recess structure 111 defined by the pillow portion 12 upon coupling (as illustrated in FIG. 7B), so that the rigid body thereof may be substantially encapsulated by the padded materials of the pillow portion 12.

Received substantially within the device compartment defined between the base member 22 and the cover panel member 24 is the multimedia system 30, which may include a display unit 32, a circuit board 34, a media source device 36, and a cooling device 38.

In some embodiments, the display unit 32 includes a display device that can receive video signals from the one or more signal source (e.g., the media source device 36) and display images based on the video signals. In some embodiments, the display unit 32 includes touch-sensing capabilities. Through the display of one or more corresponding visual icons, a touch-sensitive display unit provides an intuitive human-machine interface that allows parts of a human body (typically fingers) to be used as input tools to perform tactile/gesture operations. In one embodiment, the display unit comprises an active matrix TFT-LCD panel. In most embodiments, the display unit 32 is relatively thin, enabling the multimedia system 30 to be mounted in a standard/low profile headrest. The display unit 32 can have a widescreen format. The size of the display unit 32 can vary based on the size of the vehicle structure with which it is coupled, e.g., with the size of a headrest, within the scope of this application.

The circuit board 34 may be a laminated structure that comprises surface mounted and/or embedded circuit components configured to enable device integration between the various electronic components of the multimedia system 30. The circuit board 34 may incorporate a power supply unit for powering various mounted components. The power supply unit may be configured to accept electrical power from a onboard power source (e.g., a battery) or from an external source (e.g., from the vehicle). In some embodiments, the circuit board 34 comprises a substantially rigid structure that also provides mechanical support for components such as the display unit 32, the media source device 36, and the cooling device 38. In some embodiments, the flexible printed circuit board (FPC) may be utilized to reduce system weight and volume.

In the instant example, the media source device 36 takes the form of a DVD playback device. However, other forms of media source devices may also be incorporated in the headrest-integrated multimedia system in accordance with the instant disclosure. Particularly, the media source device 36 may be a signal source device that receives a form of media, via either wired or wireless arrangements, and produces a signal at least partially displayable on the display unit 32 of the multimedia system 30. For instance, the signal source may be wireless equipment such as a TV tuner, a radio transceiver, a LTE (Long-Term Evolution) supported Nth generation communication device, a mobile Wi-Fi device, or other comparable devices. The signal source may also include onboard wired media equipment such as a DVD reader, memory card reader, a MP3 player, or other similar device. In some embodiments, more than one media source devices may be provided in the headrest entertainment system, and may be configured to function cooperatively in conjunction with additional media devices located elsewhere in the vehicle. In some embodiments, additional devices/components may be incorporated in the multimedia system 30, such as a system built-in speaker unit and/or a microphone (not shown).

In some embodiments, the housing unit 20 is provided with correspondingly designed venting apertures (not specifically shown in the instant example) that promotes fluid circulation there-through. Such designs may economically utilize the natural phenomenon of chimney/stack effect. For instance, one or more intake vents may be provided at a lower portion of the housing unit 20 (e.g., on a downward facing surface of the base member 22 or on a lower portion of the cover panel member 24), while one or more corresponding exhaust vents being provided at an upper portion thereof. Moreover, in some embodiments (such as the instant example), one or more active cooling device (e.g., cooling fan 38) may be employed in conjunction with a passive cooling vent system to more efficiently remove heat from the device compartment of the housing unit 20. The heat to be removed can be generated by components mounted therein, e.g., the display unit 32 and the media source device 36. The cooling device 38 can be oriented or configured to force a cooling fluid, e.g., air, into the device compartment to enhance convective cooling of heat generating or heat sensitive components located therein. The cooling device 38 can be oriented or configured to draw a cooling fluid, e.g., air, out of the device compartment to enhance convective cooling. In certain embodiments, the cooling device 38 comprises a lead for coupling with a power source (not shown) on the circuit board 34. In some embodiments, the power source operates between about 9.5 Volts and about 15 Volts. The power source provides a direct current in some configurations. The cooling device 38 can be powered by the car battery. In some embodiments, a battery dedicated to the headrest system is employed to power the cooling device 38. Also, a plurality of cooling devices 38 can be used, e.g., one to force air into an intake aperture and another to draw air out through an exhaust opening, thereby enhancing cooling capacity. In the illustrated example, the cooling device 38 is configured to be arranged on a right side peripheral portion of the base member 22, with corresponding venting ports arranged on a lateral portion (e.g., a right side panel 241c) of the cover panel member 24. However, as will be further discussed, the mounting location for the cooling device 38 is not limited to the exemplary illustration of the instant figure.

The exemplary cover panel member 24 comprises a rearward facing panel 241a having a viewing window 231 defined therein for visually exposing the display unit 32 toward a rear side of the seat. Moreover, the rearward facing panel 241a traverses substantially across a width of the head support unit 10. In addition, the side panel 241c integrally extends from the rearward facing panel 241a. As discussed previously, such a design provides a wide lateral profile that traverses substantially the full width of a vehicle headrest, thus enabling accommodation for a considerably wider/bigger display unit in the housing unit 20. Such a wide panel profile is particularly suitable for accommodating popular modern high aspect ratio widescreen displays (e.g., of ratios 16:9, 21:9, or above), although display units of retrospect configurations may also be adapted, depending on specific application requirements.

While the base member 22 and the cover panel member 24 of the housing unit 20 are configured to enclosingly couple each other to define the device compartment for receiving components of the multimedia system 30, a hermetic coupling between the base member 22 and the cover panel member 24 is not necessary. In some embodiments, voids/slots may be arranged between the base member 22 and the cover panel member 24 at selective locations upon coupling to allow access to the components of the multimedia system 30 (e.g., for cable/wire routing purposes; to define media insertion ports; and/or to form ventilation/cooling passages). As will be further discussed, the coupling between the base member 22 and the cover panel member 24 may utilize substantially screw-less arrangements. For example, the components of the housing unit 22 may be configured to achieve structural coupling through a plurality of buckle units (e.g., mechanisms 225c, 226c, and 245a) respectively distributed at suitable locations of the base member 22 and the cover panel member 24 (as identified in the circles). The screw-free coupling mechanism may reduce the number of parts for the system, which may facilitate the reduction of assembly complexity and thus lowering manufacturing/servicing costs.

FIGS. 6A-6F are orthographic projections of a headrest-integrated entertainment system in accordance with one embodiment of the instant disclosure. Particularly, the six principle views of the exemplary headrest system as shown in FIG. 4 are provided to present further visual illustrations for the various features depicted in previous embodiments. For consistency purpose and ease of understanding, like features are identified with like numerals. Moreover, item numerals not relevant to a particular discussion are selectively omitted in certain figures to maintain simplicity of illustration.

Figure 6A:
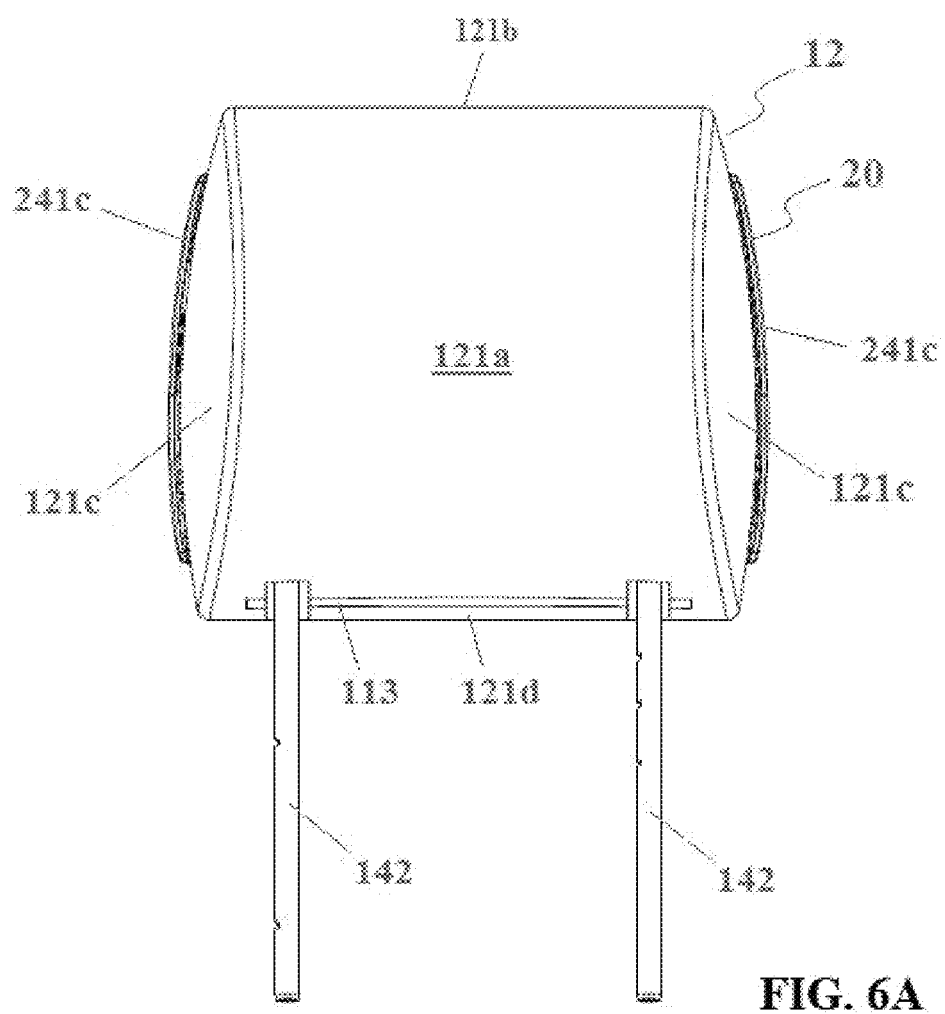
FIGS. 6A-6F are orthographic projections of a headrest-integrated entertainment system in accordance with one embodiment of the instant disclosure.

FIG. 6A illustrates a orthographic projection view of the front-facing side of the exemplary headrest-integrated entertainment system shown in FIG. 4. Particularly, the head support surface 121a of the pillow portion 12 is clearly visible in the instant viewing angle. the upward facing surface 121b, the downward facing surface 121d, and a pair of lateral side surfaces 121c are integrally connected to the head support surface 121a and extend respectively from the periphery thereof.

As discussed previously, in some embodiments, a fabric member (not specifically labeled) tailored to sleevingly cover the pillow portion of the head support unit 10 is provided. The fabric member may be tailored to assume the shape of a pocket sized and shaped to substantially conformally sleeve over the head support surface 121a of the pillow portion 12. Accordingly, the head support surface 121a, the upward/downward facing surfaces 121b/121d, and the lateral side surface 121c may be defined on the contiguously connected external surfaces of the fabric member, where the physical boarder lines there-between may not be clearly distinguishable. The fabric member may comprise fabric, such as solid or perforated leather, or other suitable material.

The downward facing surface 121d may be provided with one or more mounting post apertures positioned to allow the insertion of the mounting posts 142 there-through. In the instant example, a slit 113 having a narrow and continuous profile that traverses along a width direction of the headrest is provided on the downward facing surface 121d, with the lateral terminal portions thereof serving as the mounting post aperture of the mounting posts 142. In some embodiments, suitably shaped slits (such as slit 113) on the downward facing surface 121d may concurrently serve as a part of a venting/circulation system that promotes cooling for the multimedia system 30 (not visible from instant view) in the housing unit 20. In such cases, a lower portion of the housing unit 20 may be provided with corresponding venting arrangements to cooperatively define a flow path for the venting/circulation system. An active cooling unit (e.g., a cooling fan) may be provided in the flow path defined by the silt 113 and the corresponding venting structure to enhance the air circulation capability of the headrest system. Moreover, a strategically located venting slit may create a fluid circulation/flow path that directs air flow toward the neck area of a seat occupant, thus functioning as a built-in headrest circulator/refresher that draws/blows air around the neck of a vehicle occupant, helping the occupant stay refreshed and awake.

A thin front profile of the side panel 241c of the cover panel member 24 is also observable from the instant view angle. In most embodiments, the side panel 241c and the lateral side surface 121c cooperatively define a substantially integral lateral headrest surface, where the overall external surface contour of the side panel 241c is configured to substantially conformally match that of the lateral side surface 121c of the head support unit 10. In the instant example, although the lateral side surface 121c and the external surface of the side panel 241c are not completely flush (hence a thin profile of the side panel 241c remains observable in the front view) with each other, the joining interface there-between are configured to be substantially unitary without significant structural discontinuation. For instance, the seam line between the side surface 121c and the side panel 241c may be identifiable through visual observation yet not particularly abrupt by touch. Of course, in other embodiments, different configurations may be applied to attain particular functional requirements. As will be further illustrated, a housing unit 20 having a wider side panel 241c may be used in some cases to accommodate a even bigger display unit. A wider housing unit 20 may even allow the formation of forward-facing venting slit (e.g., slit 117 as shown in FIG. 15B) that serves as part of the built-in headrest circulator/refresher as discussed above. Nevertheless, the joining interface between the lateral side surface 121c of the pillow portion 12 and the side panel 241c of the cover panel unit 24 should be rounded to touch and sufficiently smooth to prevent scratch and cut to an occupant's body parts.

Figure 6B:
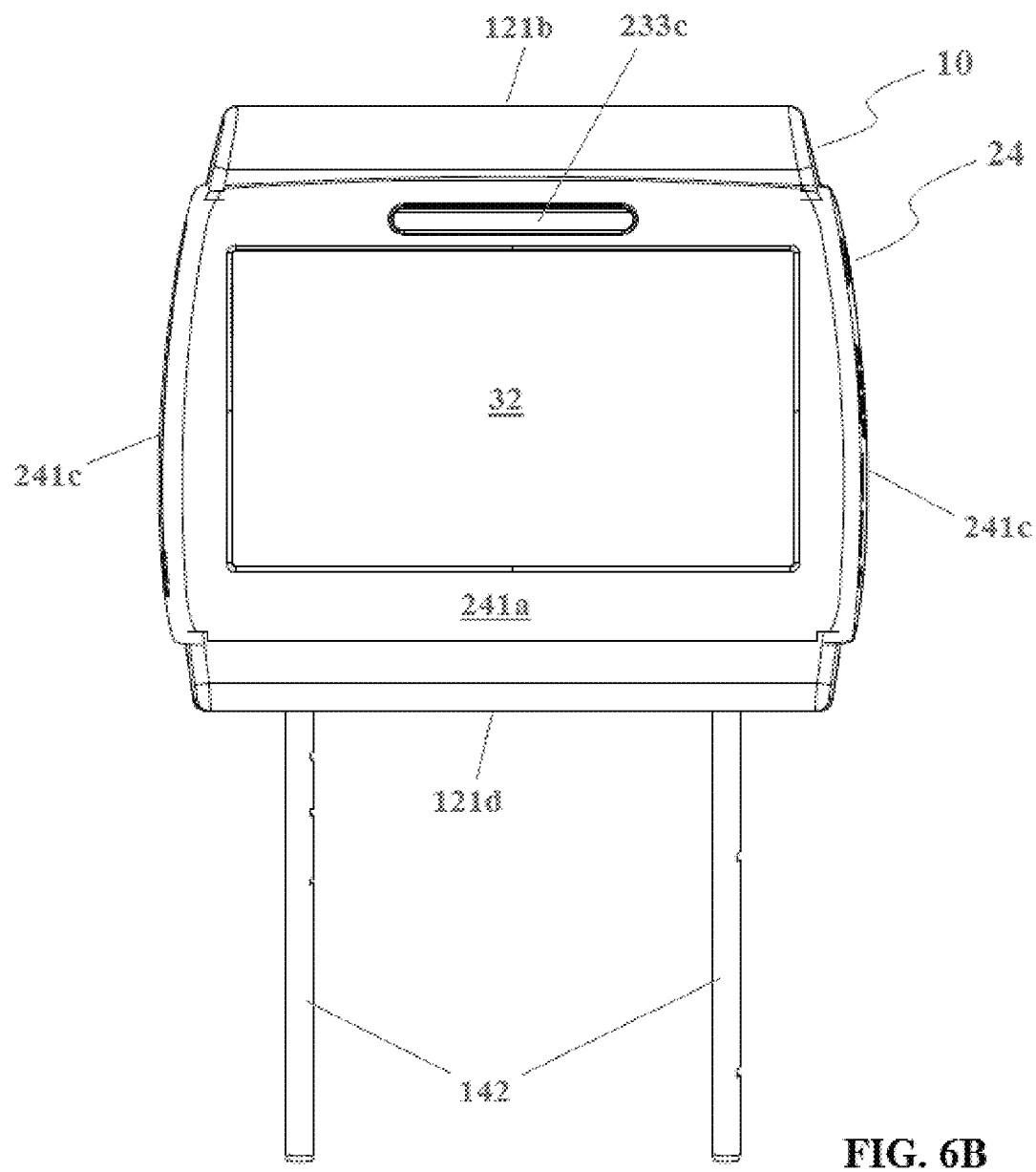

FIG. 6B illustrates a rear orthographic projection view of the exemplary headrest-integrated entertainment system shown in FIG. 4. Particularly, the rearward facing panel 241a of the cover panel member 24 is clearly visible in the instant viewing angle. The upward facing surface 121b and the downward facing surface 121d of the head support unit 10 are also visible from the instant point of view. In addition, the mounting posts 142 are shown to be downwardly extending from the downward facing surface 121d.

The rearward facing panel 241a is configured to face generally toward the back of a seat, and is arranged to be conveniently viewable by a passenger riding in a seat positioned there-behind. The rearward facing panel 241a defines a viewing window that allows visual exposure of the display unit 32 there—from. In some embodiments, the viewing window in the rearward facing panel 241a comprises a hollow/void structure that physically exposes the display unit of the multimedia system 30 there-through. Such an arrangement is particularly applicable for display units having touch-sensing capabilities. In some embodiments, the viewing window in the rearward facing panel 241a comprises a transparent laminate that offers additional protection to the display unit 32. In the instant example, an auxiliary window 233c is provided above the viewing window to allow exposure/accessibility of other components of the multimedia system 30 (not labeled), e.g., a wireless transceiver for remote controls. In some embodiments, the viewing window and the auxiliary window are arranged as a single integrated unit. Other positioning and arrangements are possible to achieve different aesthetic/visual effects suitable for particular applications.

The exemplary headrest system utilizes a fixed, non-pivotal mounting arrangement for the display unit 32. As modern wide angle display devices may incorporate sophisticated features such as glare reduction and auto-brightness adjustment, a pivotal mounting arrangement may be replaced with a fixed mounting scheme that favors mechanical simplicity. Moreover, a fixed-angle mounting arrangement may be particularly suitable for touch screen operations, as the relative position/orientation of the display device with respect to the headrest unit is retained to ensure a secured/predictable finger operation on the surface of the touch screen.

Figure 6C:
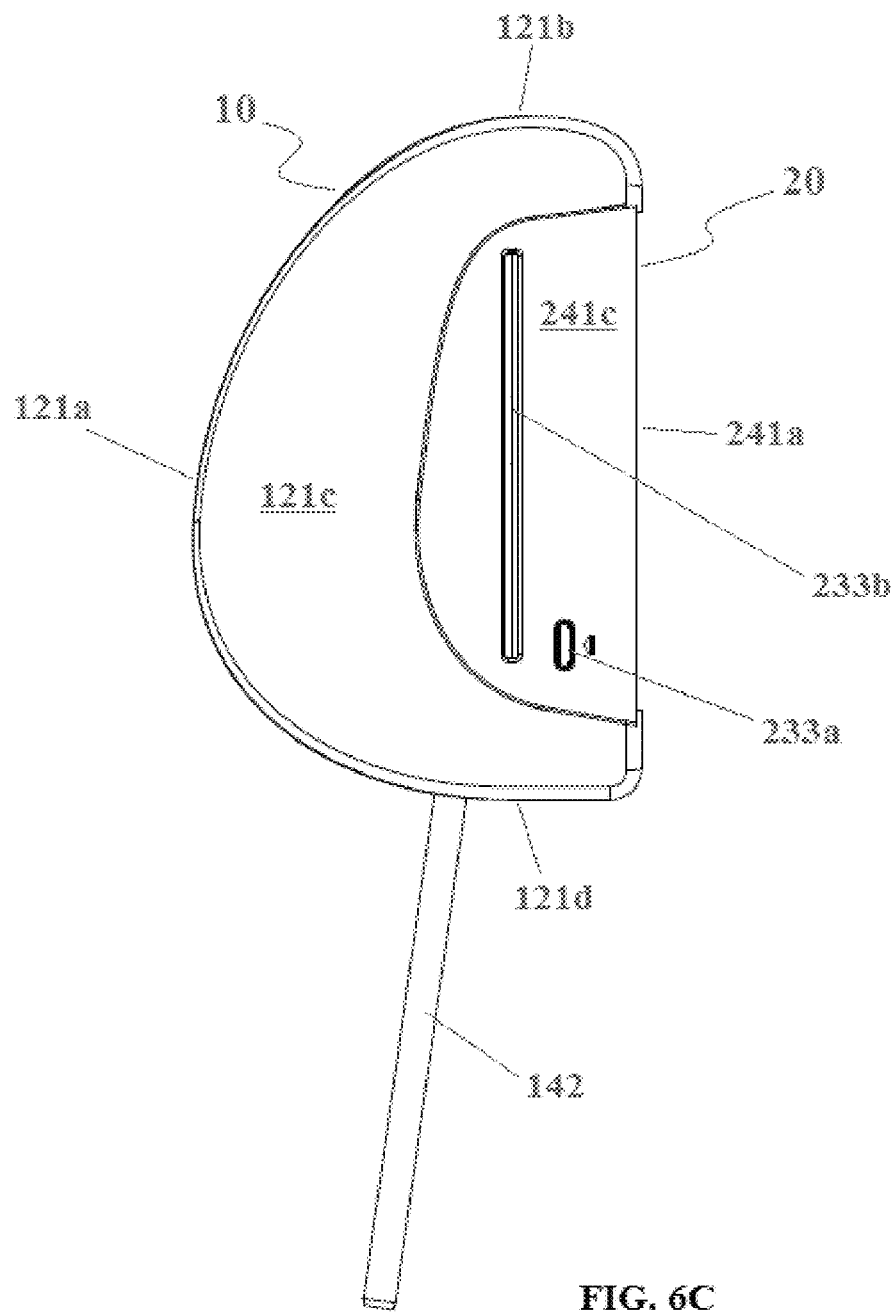
Figure 6D:
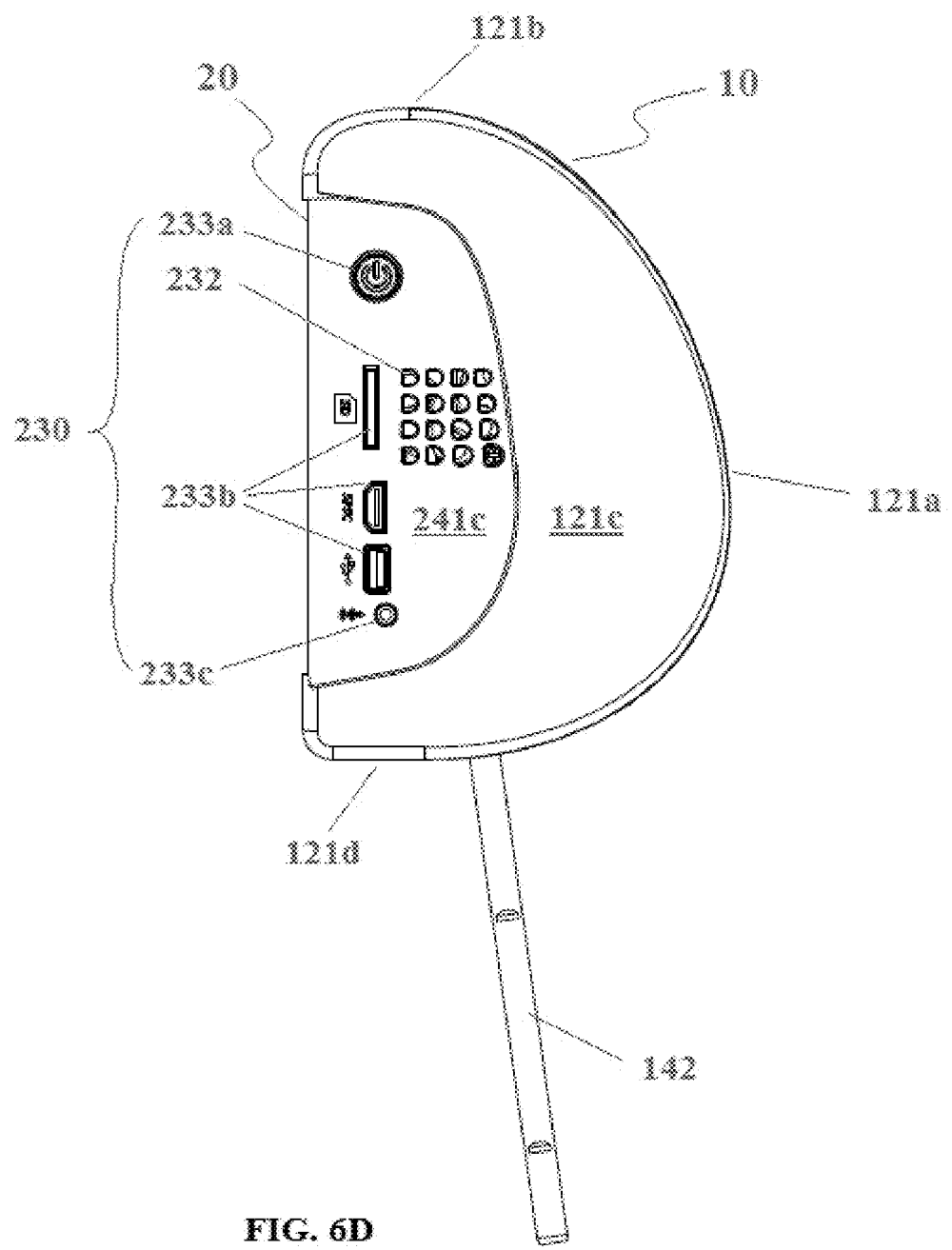

FIG. 6C illustrates a left orthographic projection view, while FIG. 6D illustrates a right orthographic projection view of the exemplary headrest-integrated entertainment system shown in FIG. 4. Particularly, the lateral views provide better illustrations of the lateral headrest surfaces of the exemplary headrest system.

In the instant example, the exposedly arranged side panel 241c toward the back side and the lateral side surface 121c toward the front side of the headrest system cooperatively define a substantially integral lateral headrest surface. Particularly, the side panel 241c of the housing unit 20 extends integrally from the rearward facing panel 241a toward the forward direction of the seat, and is structurally configured to meet the side lateral side surface 121c of the head support unit 10. Specifically, the instant embodiment incorporates a relatively concealed/recessed design, in which a top/bottom surface of the housing unit 10 is respectively wrapped/covered by the head support unit 10. In other embodiments, an exposed/revealing design may be employed, in which a greater portion of the cover panel member 24 of the housing unit 20 is arranged external of the head support unit 10, as illustrated by the embodiment shown in FIG. 3A.

The overall external surface contour of the side panel 241c is configured to substantially conformally match that of the lateral side surface 121c. For instance, in the instant embodiment, the pillow portion 12 has a lateral profile that defines a recessed shape, e.g., a substantially crescent lateral planar profile, having a concavity thereof facing generally toward the rear side of the seat. Correspondingly, the side panel 241c of the head support portion 10 is configured with a forward-facing convex profile that substantially matches the concave contour of the lateral side surface 121c. The substantially integral headrest surface cooperatively defined by the lateral surfaces of the head support unit 10 and the housing unit 20 contributes both to aesthetic unity of the headrest system 1a and the operational safety thereof.

Also visible from the instant lateral views are the various accessible features arranged on the left/right side panels 241c, such as control bottom ports 233a, media loading ports 233b, signal access port 233c, and a plurality of ventilation ports 232. As discussed above, the side panel 241c provides a convenient location for housing a variety of device features 230 for easy access to the multimedia system 30 in the housing unit 20. In the instant example, control bottom ports 233a (e.g., a power bottom port on the right side panel and a disc rejection bottom port on the left side panel) to allow convenient device control of the multimedia system 30. A DVD disc loading port (e.g., port 233b) is provided on the left side panel 241c to enable easy disc swapping, as shown in FIG. 6C. More media loading ports 233b for media devices of other formats (e.g., Secure Digital (SD) card loading port and Universal Serial Bus (USB) interface) are provided on the right side panel 241c, as shown in FIG. 6D. Furthermore, one or more signal access port 233c may be provided on the side panel 241c (e.g., video signal ports such as High Definition Multimedia Interface (HDMI) port and audio signal port) to enable signal input/output to/from the multimedia system 30. Additional functional features may be incorporated on the side panel 241c to expand the accessibility and/or functionality of the headrest system. In some embodiments, one or more onboard audio output device (e.g., speaker unit) are incorporated in the multimedia system 30. In such cases, corresponding audio apertures may be arranged at suitable locations of the lateral side panels to form a portion of a personal surround sound environment. A headrest-integrated audio system as exemplified above may also be utilized to enable further functions such as personal communication (e.g., telephone conversation), vehicle navigation/warning (e.g., providing voice navigation and/or issuing vocal warnings), and/or in-car voice controls (e.g., voice command system).

Figure 6E:
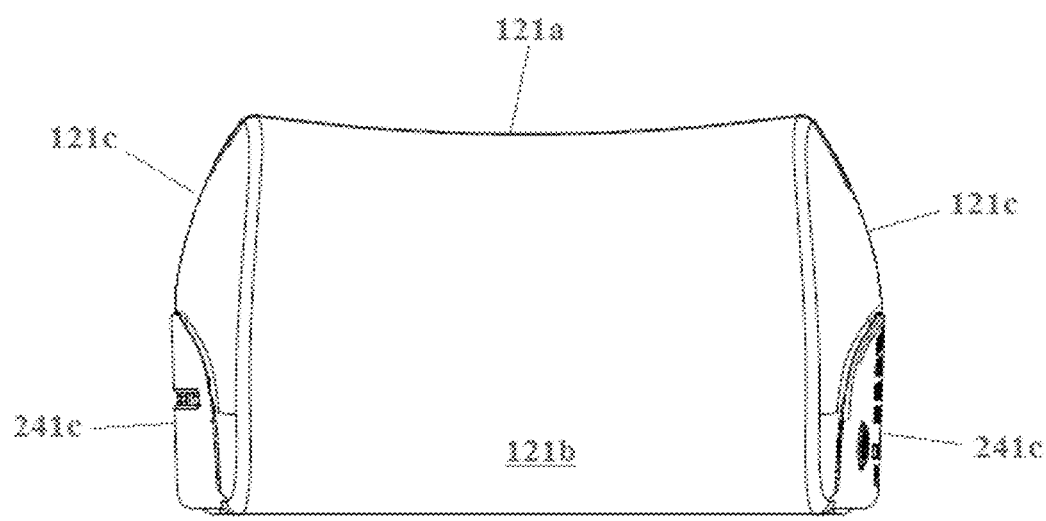
Figure 6F:
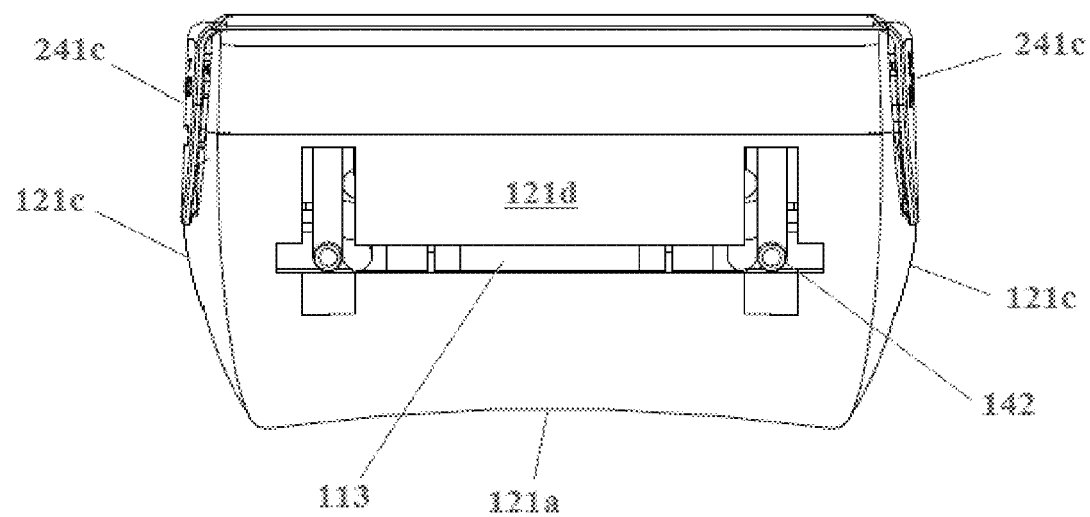

FIG. 6E illustrates a top orthographic projection view, while FIG. 6F illustrates a bottom orthographic projection view of the exemplary headrest-integrated entertainment system shown in FIG. 4. Particularly, the plan views provide better illustrations of the substantially integral arrangement of the lateral headrest surfaces.

As shown FIG. 6E, the head support surface 121a is oriented toward the top of the page. The upward facing surface 121b and the left/right lateral side surfaces 121c are integrally joined with and respectively extending from the head support surface 121a. In the instant embodiment, the joining interface between the side surface 121c and the side panel 241c are configured to be substantially flush with each other, e.g., jointly forming a substantially flat planar surface. It is noted that, a completely seamless arrangement is achievable but not mandatory to provide a substantially flush lateral surface, so long as the joining interface between the side panel 241c and the lateral side surface 121c are configured to be substantially unitary without significant structural protrusion/recession, interruption and/or discontinuation. In some embodiments, the seam line between the side surface 121c' and the side panel 241c' may be identifiable through visual observation yet not particularly abrupt by touch. In some embodiments, the substantially flush arrangement may comprise a "tucked-in" configuration, where the edge/boarder portion of the side panel 241c is slightly narrower than a width of the head support unit 10 so that it can be covered by the lateral side surface 121c of the pillow portion 12 (e.g., when viewed from above, as illustrated in the view of FIG. 6E). In some embodiments, the side panel may comprise a "tucked-out" configuration, where the edge/boarder portion of the side panel 241c is slightly wider then a width of the head support unit 10 so that it can pressingly cover a portion of the lateral side surface 121c (e.g., when viewed from above).

However, different configurations may be applied in other embodiments to attain particular functional requirements. For instance, as will be further illustrated (e.g., in FIG. 15), the housing unit 20 may employ a side panel 241c that is wider than the width of the head support unit 10 to accommodate a bigger display unit (e.g., FIG. 15A), and/or to allow the formation of forward-facing venting slit (e.g., slit 117) that serves as part of the built-in headrest circulator/refresher as discussed above (e.g., FIG. 15B). Nevertheless, the joining interface between the lateral side surface 121c of the pillow portion 12 and the side panel 241c of the cover panel unit 24 should generally be rounded to touch and sufficiently smooth for safety and aesthetic reasons.

As shown in FIG. 6E, the bottom projection view of the exemplary headrest-integrated entertainment system provides a better illustration of the mounting post aperture/slit 113. In the instant example, the slit 113 provided on the downward facing surface 121d is configured to assume a narrow and continuous profile that traverses along a width direction of the headrest, thus enabling the mounting posts 142 of the head support portion 10 to extend respectively through the lateral end portions thereof. In some embodiments, the slit 113 on the downward facing surface 121d may concurrently serve as a part of a venting/circulation system that promotes cooling for the multimedia system 30 in the headrest system. For instance, a lower portion (e.g., a downward-facing portion) of the housing unit 20 may be provided with corresponding venting arrangements that substantially matches the profile of the slit 113 on the downward facing surface 121d of the head support unit 10, so as to cooperatively define a flow path that enables fluid communication to the multimedia system 30 in the housing 20. Moreover, in some embodiments, an active cooling device (e.g., a cooling fan 38 shown in FIG. 5) may be provided in a suitable location along the flow path to enhance the air circulation capability of the headrest system. For instance, a cooling fan may be arranged on a downward facing surface/bottom wall of the housing unit 20 to draw air through the slit 113 into the housing unit 20 (or alternatively blow air out of the housing unit 20 through the slit 113). Accordingly, although the instant embodiment utilizes a cooling fan 38 arranged on the right side of the housing 20 configured to breathe through the ventilation ports 232 on the right side panel 241c, the practical placement of the cooling device is not limited to the exemplary illustration. Furthermore, in some embodiments, a suitably arranged venting/circulation system may create a flow path that directs air flow toward a seat occupant, e.g., functioning as a built-in headrest circulator/refresher that draws/blows air around the neck of a vehicle occupant, thereby helping to keep the occupant stay refreshed while boarding/operating the vehicle. Nevertheless, in some embodiments, the downward facing surface 121d is simply provided with one or more individual mounting post aperture sized and shaped to respectively allow passage of the mounting posts 142 there-through for mechanical simplicity.

Figure 7A:
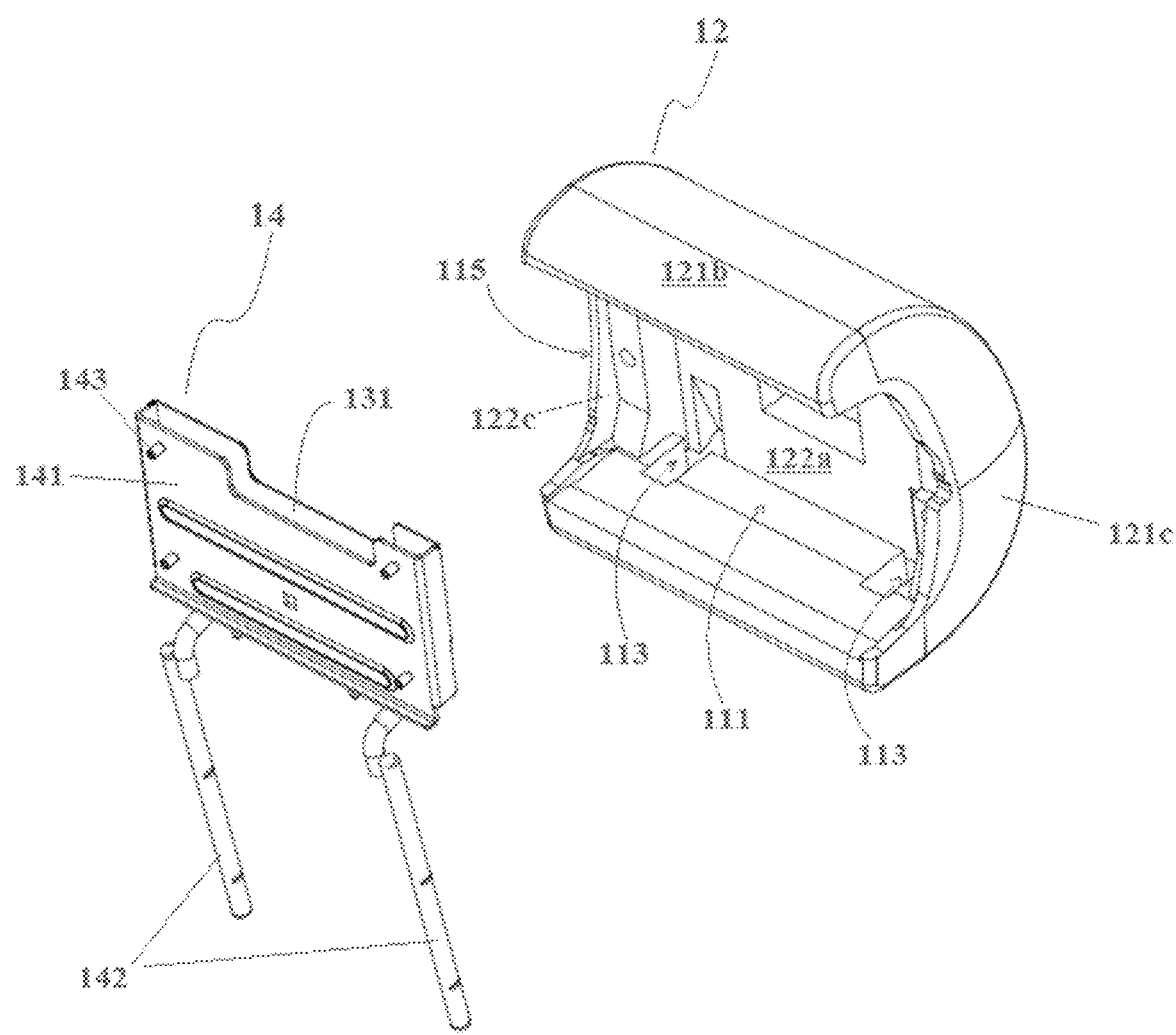
FIGS. 7A-7B are isometric illustrations of a head support unit in accordance with one embodiment of the instant disclosure.
Figure 7B:
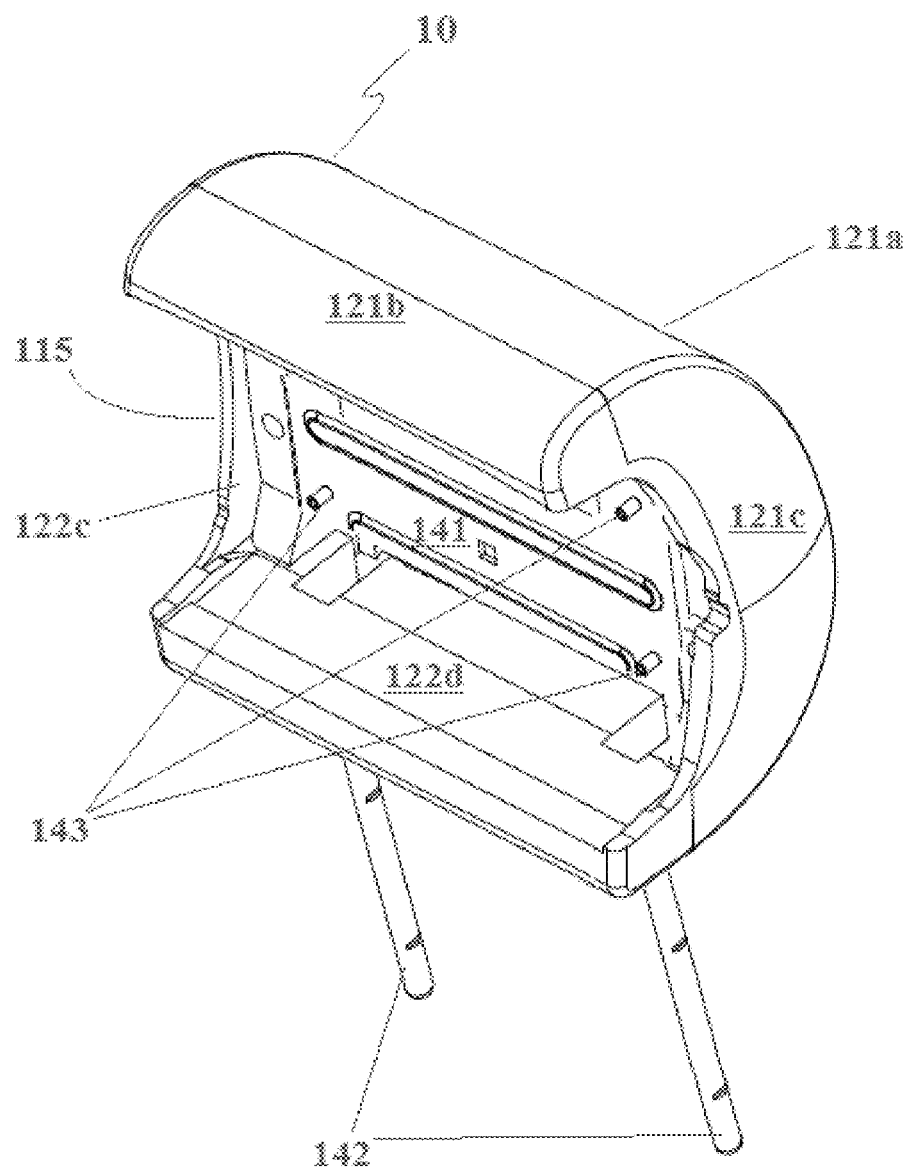

FIG. 7A-7B are isometric illustrations of a head support unit in accordance with one embodiment of the instant disclosure. Particularly, the isometric views provide illustrations of the coupling arrangement between the pillow portion 12 and the support portion 14 of the head support unit 10.

FIG. 7A shows individual components of the head support unit 10, namely, the pillow portion 12 and the support portion 14, prior to assembly. As previously discussed, the pillow portion 12 is configured to provide ergonomic support for the head of a seat occupant, particularly through the head support surface 121*a*. The exemplary pillow portion 12 comprises a concave body that defines a recess structure 111. Viewable from FIG. 7A, an inner backward facing surface 122*a* (substantially opposite to the head support surface 121*a*) and the inner peripheral surfaces (e.g., inner bottom surface 122*d* and inner side surface 122*c*) jointly constitute the recess structure 111. The inner side surfaces 122*c* is associated with a shallower side wall of the pillow portion 12 (e.g., compared to the depth associated with the inner bottom surface 122*d* or the non-visible inner top surface opposite to the upward facing surface 121*b*), which defines a concavity 115 that faces substantially toward the back of the pillow portion 12. Accordingly, the lateral side surface 121*c* of the exemplary pillow portion 12 comprises a substantially crescent profile, with the concavity 115 thereof facing generally toward the rear side of the seat. Moreover, in the instant example, a pair of suitably sized and shaped mounting post apertures 113 are provided on the inner bottom surface to allow passage of the mounted posts 142 there-through.

In the instant example, the left and right external lateral side surfaces 121*c* are arranged substantially parallel to each other, with the padded materials of the pillow portion 12 generating a slightly tapered profile toward the frontal head support surface 121*a*. However, the practical configuration of the pillow portion is not limited to the instant exemplary illustration. For example, in some embodiments, the lateral side surfaces 121*a* of the pillow portion 12 may be provided with a noticeable tapered profile with the wider end arranged toward the rear of the seat. Such a configuration may complement a similarly tapered housing unit 20 to accommodate a larger/wider display device (as illustrated by the embodiment shown in FIG. 15A).

Figure 9A:
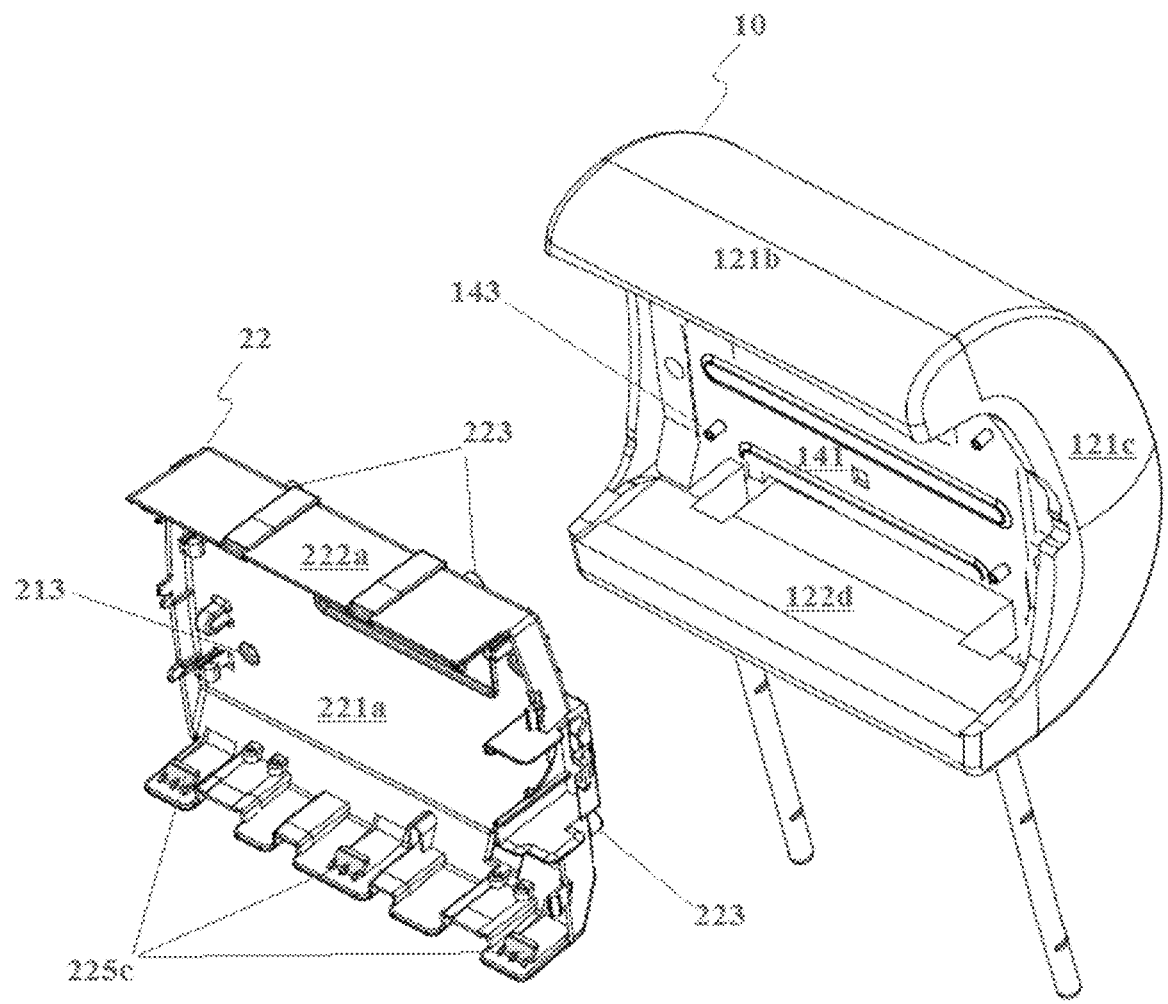
FIGS. 9A-9B illustrates fitment of a base member and a head support unit in accordance with one embodiment of the instant disclosure.

The support portion 14 is configured to be coupled to the pillow portion 12 through suitable retaining arrangements. In the instant embodiment, the support portion 14 comprises a substantially rigid frame structure that includes a mounting bracket portion 141 having a generally hollow interior 131 and a pair of mounting posts 142 extending generally downward from the lower portion of the mounting bracket portion 141. As will be discussed further, the mounting bracket portion 141 may comprise one or more retaining feature 143 to facilitate secure coupling with other components of the headrest system. For example, retaining features 143 may be provided on a backward facing side of the mounting bracket portion 141 to facilitate secure retention of the base member 22 (as shown in FIG. 9A). Likewise, retaining feature 143 may be provided on a forward facing side of the mounting bracket portion 141 (not visible from instant view) to enable secure coupling between the support portion 14 and the pillow portion 12. In the instant example, the retaining feature 143 includes an protruding tubular member extending from the surface of the bracket portion 141 and having threads formed therein to receive a fastener, such as a screw or a bolt. In other embodiments, different forms of retaining features may be used.

The hollow interior 131 of the mounting bracket portion 141 contributes to the overall weight reduction of the headrest system, at the same time offers higher degree of wiring flexibility for the electronic components of the multimedia system 30, as the hollow interior 131 allows cables of the electronic components to be stored therein and/or routed there-through to reach suitable locations in the vehicle. Moreover, in the instant embodiment, at least one of the mounting posts 142 comprises a hollow post body defining a passage that enables fluid communication to the hollow interior 131 of the mounting bracket portion 141. The passage defined in the hollow mounting post allows at least a portion of a cable to/from the headrest system to be arranged therein.

In the instant embodiments, the pillow portion 12 is blow molded as a separate component and is configured to receive at least a portion of the support portion 14 during assembly such that the pillow portion 12 and the support portion 14 could be disassembled after shipment from the factory. As previously discussed, the separate arrangement of the pillow portion 12 and the support portion 14 in the instant example facilitates the ease of manufacturing. Moreover, by using separate and discrete components for the head support unit 10, each of the individual parts can be shipped, stored, serviced, and replaced separately from the other components of the assembly. Suitable coupling arrangements may be adopted to achieve secure coupling between the pillow portion 12 and the support portion 14, including the use of screws and bolts, hooks and slots, conformal shaping/pressing fitment, and insertion/over molding, etc. However, the structurally separate arrangement is not mandatory. In some embodiments, a substantially integral and unitary arrangement for the head support unit 10 is utilized. For instance, the pillow portion 12 may be formed by blow-molding a foam material into a mold having a shape and design appropriate for the car in which the head support unit 10 is to be used. The head support unit 10 can have the same outer shape and design as the factory headrest. The pillow portion 12 can then be wrapped in a suitable material, such as a fabric member (not separately shown/labeled), e.g., solid or perforated leather, or other suitable material. In some embodiments, the pillow portion 12 is blow molded directly onto a portion of the support portion 14 such that the pillow portion 12 and the support portion 14 are integrally connected.

FIG. 7B shows the pillow portion 12 and the support portion 14 of the head support unit 10 upon assembly. Particularly, the mounting posts 142 of the support portion 14 respectively extend from the downward facing surface of the pillow portion 12 through the mounting post apertures 113 (now non-visible). Moreover, a plurality of retaining features 143 are exposedly arranged on the backward facing surface of the mounting bracket portion 141, each configured to provide a retention interface for mounting the base member 22 of the housing unit 20.

Figure 8:
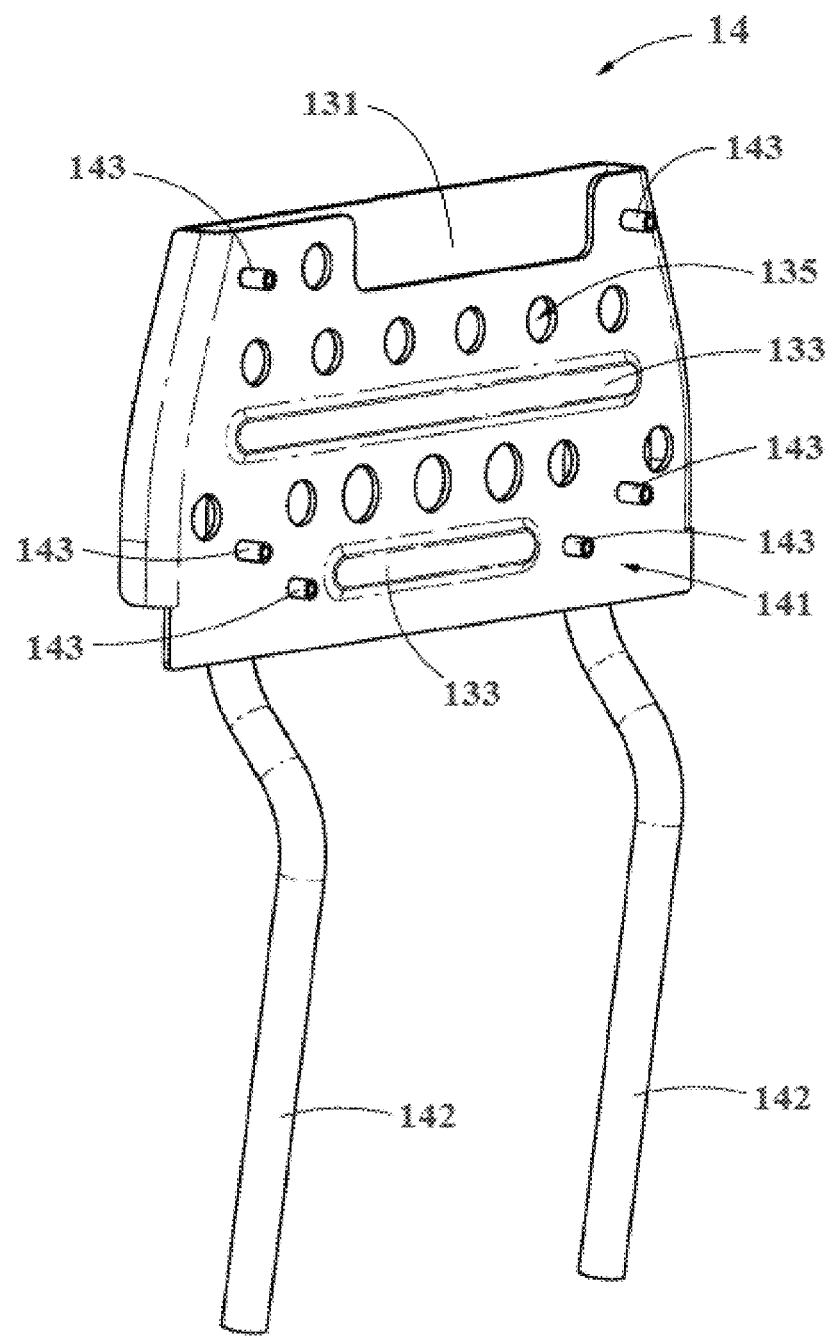
FIG. 8 is an isometric view of a component of a head support unit in accordance with one embodiment of the instant disclosure.

FIG. 8 is an isometric view of a component of a head support unit in accordance with one embodiment of the instant disclosure. Particularly, FIG. 8 shows an exemplary support portion 14 of the head support unit 10.

In the instant example, the support portion 14 includes a mounting bracket portion 141 that defines a relatively flat surface. Moreover, the mounting bracket portion 141 comprises a hollow interior 131. The mounting bracket portion 141 further comprises a plurality of apertures or openings 135 formed on the backward facing surface thereof. The apertures 135 may further reduce material costs of production and/or the weight of the support portion 14 without significantly affecting the structural integrity thereof.

In addition, the support portion 14 includes a pair of horizontally extending reinforcing members 133. The reinforcing members 133 can include substantially elongated channels that are raised, or alternatively, recessed, relative to the backward facing surface of the mounting bracket portion 141. In some arrangements, the apertures 135 and the hollow interior 131 of the mounting bracket portion 141 constitutes a portion of the flow path for the venting/circulation system as discussed above (e.g., cooperating with the intake/slit 133 in accordance with the discussion for FIG. 6F).

The mounting bracket portion 141 is further provided with a plurality of retaining features 143 arranged at suitable locations of the planar body thereof, with which the base member 22 and/or other components of the headrest entertainment system can be coupled. As will be further illustrated, the retaining features 143 extend rearward from the substantially planar part of the mounting bracket portion 141 and can be accepted by correspondingly configured coupling structures defined on a forward facing surface of the base member 22. Accordingly, in some embodiments, the retaining feature 143 can inhibit rotation of the base member 22 about an axis perpendicular to the planar surface of the mounting bracket portion 141. In some embodiments, the retaining features 143 may be tapped. Other arrangements for the protrusions or retaining features 143 are also possible.

Figure 9B:
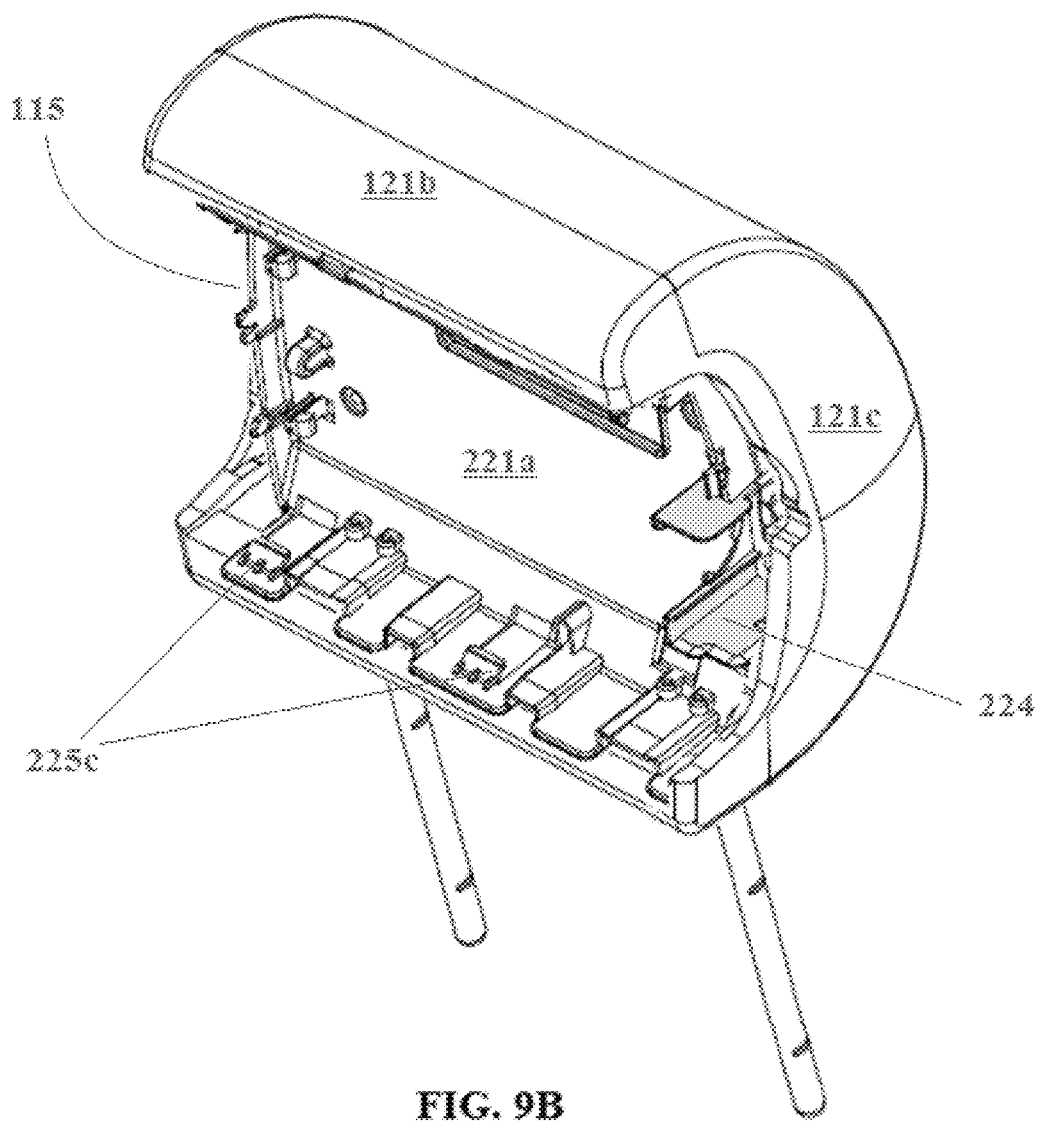

FIG. 9A-9B illustrates fitment between the base member and the head support unit in accordance with one embodiment of the instant disclosure.

Particularly, FIG. 9A shows an exemplary base member 22 and a head support unit 10 before assembly. As discussed previously, the mounting bracket portion 141 of the support portion 12 is exposedly retained in the recess structure 111 of the pillow portion 12, with one or more suitably arranged retaining feature 143 facing toward a rear of the headrest to receive the base member 22. The exemplary base member 22 comprises a structural arrangement resembling a shallow tray that defines a rearward facing cavity for housing components of a multimedia system 30. Particularly, the shallow tray body of the exemplary base member 22 generally comprises a base plate portion (with an inner base surface 221a thereof visible from the instant view) and a plurality of peripheral plate portions (e.g., a top plate portion having an outer top surface 222a visible from the instant view; and a bottom plate portion with a plurality of buckling members (e.g., 225c) arranged thereon for establishing screw-free coupling with the cover panel member 24). As will be further illustrated (e.g., in FIG. 11C), the base plate portion of the base member 22 is provided with a plurality of fastener apertures 213 arranged at locations in correspondence with the retaining features 143 of the mounting bracket portion 141. In addition, as will be further illustrated, the forward facing surface of the base member 22 may be provided with a plurality of correspondingly arranged fastening extensions 228 configured to establish mechanical interference with the retaining features 143 in order to facilitate secure coupling of the base member 22 to the head support unit 10.

FIG. 9B shows an isometric view of the base member 22 and the head support unit 10 upon assembly. Particularly, the base member 22 is configured to be received at least partially in the recess structure 111 (now non-visible) defined by the pillow portion 12 upon assembly, so that the rigid body thereof may be substantially encapsulated by the padded materials of the pillow portion 12.

Figure 10A:
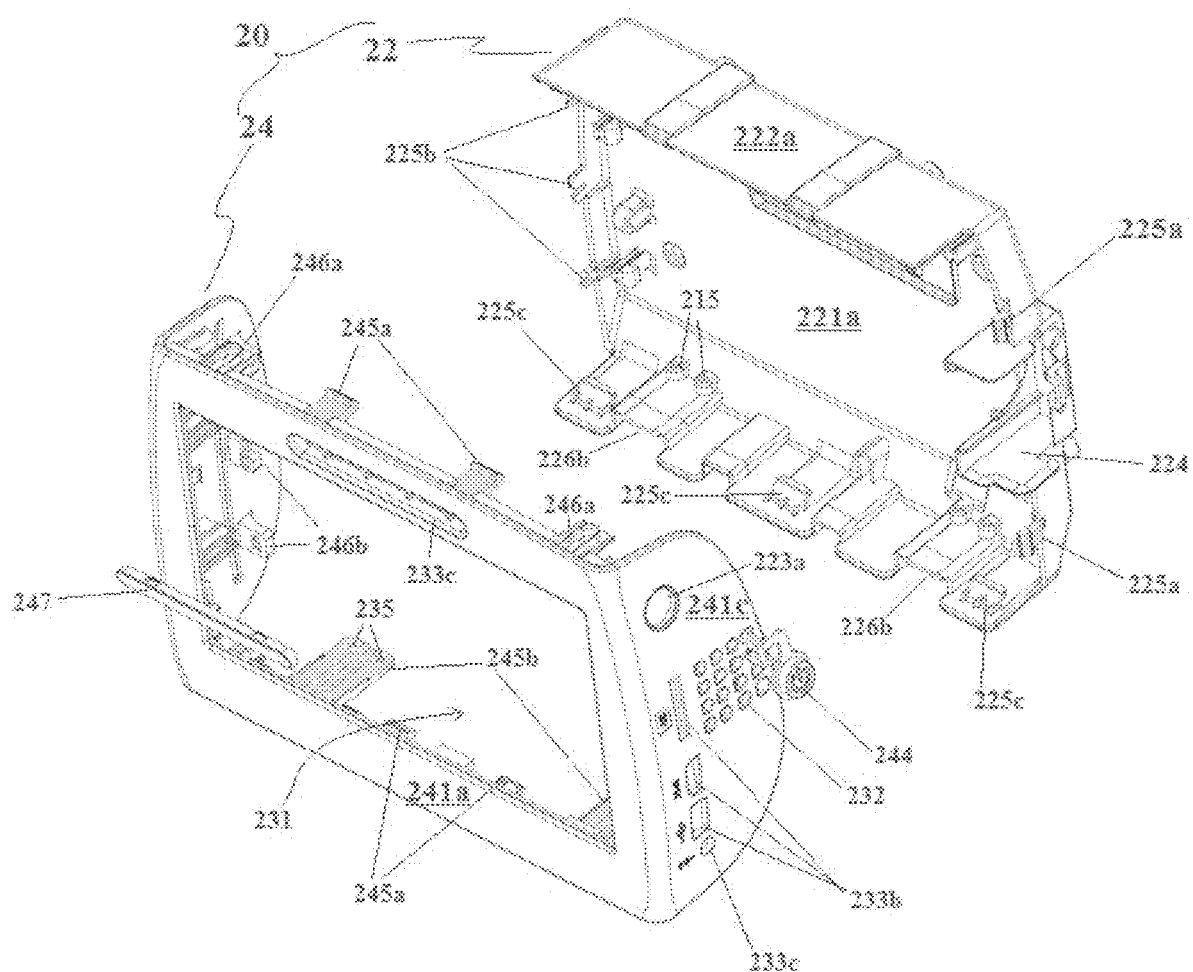
FIGS. 10A-10B illustrate fitment of a cover panel member and a base member in accordance with one embodiment of the instant disclosure.
Figure 10B:
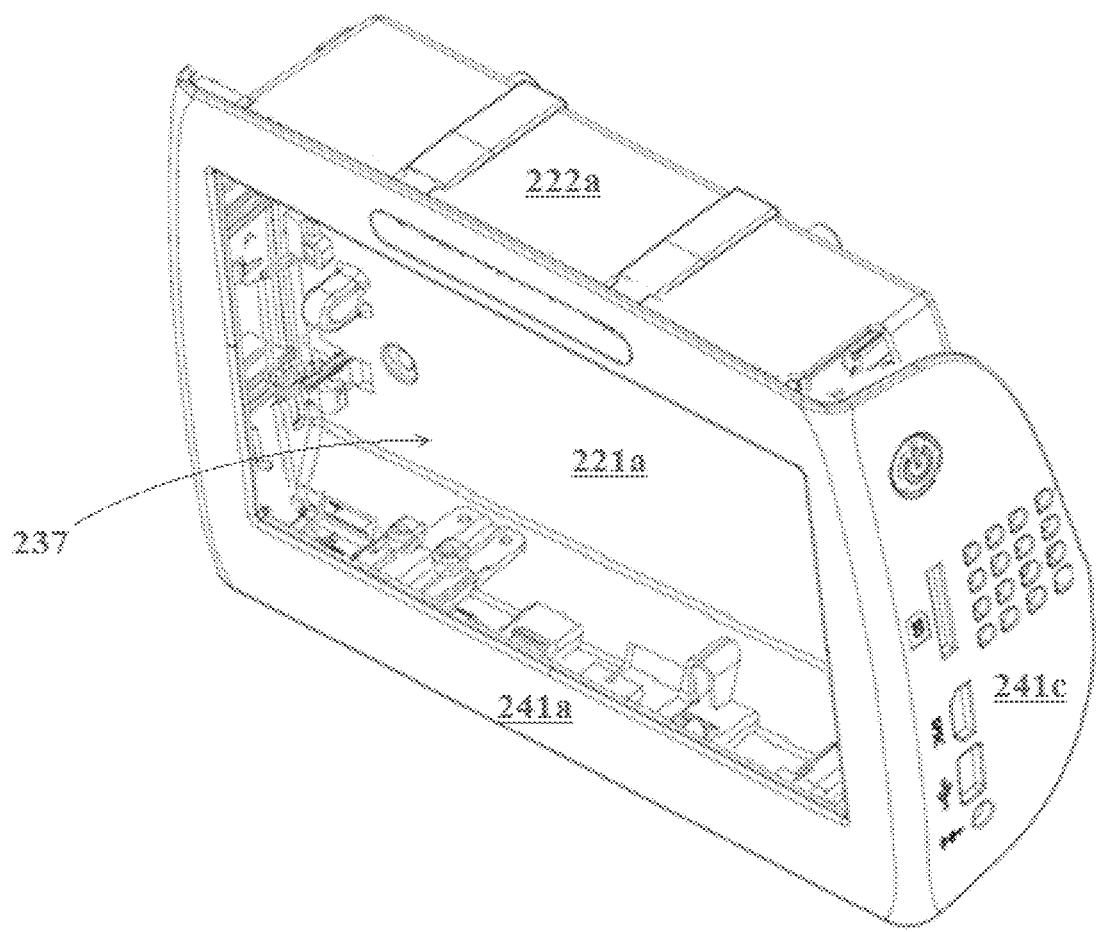

FIGS. 10A-10B are isometric views illustrating fitment of a cover panel member and a base member in accordance with one embodiment of the instant disclosure. Particularly, FIG. 10A shows various detail features of the exemplary base member 22 and cover panel member 24, and FIG. 10B shows the exemplary base member 22 and the cover panel member 24 upon enclosing coupling. References are also collectively made to FIGS. 11A-11C (which are isometric views of the exemplary base member 22 as shown in FIG. 10A), to FIGS. 12A-12F (which are orthographic projections of the exemplary base member 22 shown in FIG. 10A), and to FIGS. 13A-13E, (which are orthographic projections of the exemplary cover panel member as shown in FIG. 10A) for the ensuing discussion to provide clarity of illustration, as certain features not visible in one particular figure may be apparent in another figure of a different observation angle. However, as a particular feature may appear repetitively in different figures, a collective discussion for the detail features of the exemplary device will be provided in favor of warranting separate depictions for each of the abovementioned figures. Moreover, similar components/features are identified with similar numerals, and components/features depicted previously are omitted for the brevity of disclosure.

The exemplary base member 22 and cover panel member 24 are configured to enclosingly couple each other through a substantially screw-free arrangement. Such a design helps to reduce the number of parts for the system and facilitate the reduction of assembly complexity, thereby lowering manufacturing/servicing costs. Particularly, the base member 22 and the cover panel member 24 are configured to couple each other through a plurality of integrally formed buckle units respectively distributed thereon (e.g., buckle mechanisms 225a/b/c and 226a on the base member 22, or buckle mechanisms 245a/b and 246b on the cover panel member 24). In the instant embodiment, each buckle unit comprises a pair of cooperating components, for example, a engaging (male) member (e.g., 225a/b/c; 245a/b) and a receptacle (female) member (e.g., 226a; 246b) respectively distributed on one of the base member 22 and the cover panel member 24. Specifically, the engaging members 225a/b/c represent different types of male buckle components arranged on the base member 22, while the engaging members 245a/b indicate different types of male buckle components arranged on the cover panel member 24. Similarly, the receptacle member 226a represents a female buckle component arranged on the base member 22, while the receptacle member 246b indicates a female buckle component arranged on the cover panel member 24.

The buckle unit may comprise various types of releasable retaining mechanisms. By way of example, the engaging member of the buckle unit may take the form of a fully protruding hook extensions, e.g., a hook member provided on a post (or a protrusion) member that extends from a surface of either one of the base member 22 and the cover panel member 24. Particularly, the exemplary housing unit 20 comprises a plurality of fully protruding hook extensions 245a arranged on the upper and lower fringes of the forward facing surface of the cover panel member 24 (as visible in FIG. 10A), as well as a plurality of fully extending hook extensions 225a provided on the right peripheral plate portion of the base member 22 (as visible in FIGS. 10A and 11B).

Figure 11A:
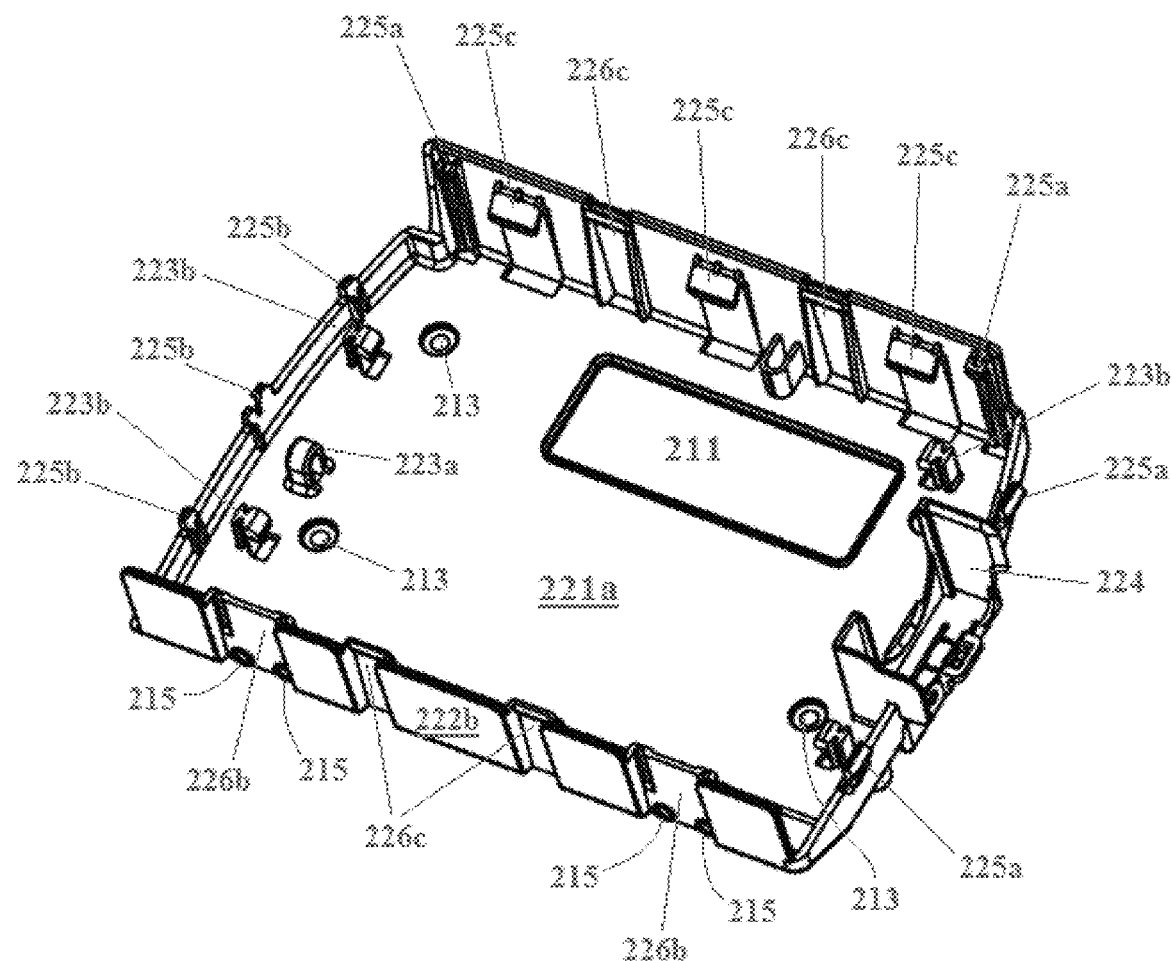
FIGS. 11A-11C are isometric views of a base member in accordance with one embodiment of the instant disclosure.

Alternatively, the engaging member of the buckle unit may take the form of a semi-protruding hook extension, e.g., a hook member provided on an inner surface of the peripheral plate portion of the base member 22. Visible in FIG. 10A, the exemplary base member 22 is provided with three semi-protruding hook extensions 225c, each of which comprises a hook portion that integrally extends from the inner surface of the bottom peripheral plate portion of the base member 22. Likewise, as illustrated in FIG. 11A, the exemplary base member 22 further comprises three semi-protruding hook extensions 225c on the inner surface of the top peripheral plate portion thereof.

Correspondingly, the receptacle member may take the form of a recessive hook slot (e.g., recessive slot 226c). Particularly, the recessive slot 226c may be provided on an inner surface of the peripheral plate portion of the base member 22 at suitable locations configured to accept a hook extension of the engaging member (e.g., 225a/c). As visible in FIG. 11A, each of the top and bottom peripheral plate portions (e.g., on the surface opposite to the top-facing surface 222a of the base member 22 and on the downward facing panel 222b thereof) are provide with a pair of recessive slots 226c to configured to receive engaging members of the cover panel member 24.

Alternatively, the receptacle member may take the form of an protruding hook slot (e.g., slot extension 246a). The protruding hook slot may be an extension structure having a hook slot defined thereon arranged on a surface of either one of the base member 22 and the cover panel member 24. Particularly, in the instant example, a pair of integrally formed slot extensions 246a are provided on the outer regions of the upper fringe of the cover panel member 24 proximate the side panels 241c, each of which is configured to establish mechanical interference with a hook extension 225a arranged at the respective left/right ends of the top peripheral plate of the base member 22.

The buckle unit may further comprise other types of engaging/receptacle members to provide alignment and/or maintain relative positions between the base member 22 and the cover panel member 24. For instance, visible from FIGS. 10A and 11A/B, the buckle unit of the instant embodiment further comprises a plurality of positioning tab 225b on the left peripheral plate portion of the base member 22. Accordingly, a plurality of positioning slots 246b, each configured to accept a corresponding positioning extension 225b, are provided on the inner surface of the left side panel 241c. The position tabs 225b and the corresponding slots 246b may provide quick reference to a worker during device assembly, as the tab and the slots may help to correctly orientate/retain the relative positions between the base member 22 and the cover panel member 24 so as to ensure proper alignments before snapping the hook members (e.g., 225a/c; 245a) into their respective hook slots (e.g., 226a/c; 246c).

In some embodiments, the engaging members and the receptacle members of the buckle units may be provided with releasable features, thereby facilitating the ease of disassembly of the headrest entertainment unit for service/repair. For instance, the components of the buckle units may be made by elastic materials, e.g., plastic polymer based materials, which enable deformation upon the application of external force. Such arraignment may allow a person to exert pressure at suitable locations of the housing unit 20 to unsnap the hooks from their respective slots. In some embodiments, disassembly tabs and/or disassembly slots (not shown) may be provided at suitable locations of the housing unit 20 to enable easy take down of the cover panel member 24 from the base member 22.

While the instant embodiment utilizes a substantially screw-free design that facilitates easy assembly, supplementary screw fasteners may nevertheless be used at strategic locations to provide extra level of retention security. For example, as visible in FIGS. 10A/13E, each of the two positioning tabs 245b arranged on the lower fringe portion of the cover panel member 24 are provided with a pair of screw holes 235 to receive a screw fastener (not shown). Correspondingly, as visible in FIGS. 10A/11B/12F, each of the two recessive positioning slots 226b arranged on the lower peripheral plate portion of the base member 22 is also provided with a pair of screw holes 215 configured to aligningly overlap the screw holes 235 on the cover panel member 24. Accordingly, the otherwise non-interlocking tab 245b and slot 226b may be structurally jointed by the additional provision of one or more screw fastener through the respective screw holes 215/235 to further strengthen the structural coupling between the cover panel member 24 and the base member 22. The downward facing surface (e.g., surface 121d) of the head support unit 10 may be provided with correspondingly arranged screw access port to allow accessibility to the screw holes 215/235 of the housing unit 20.

Referring to FIG. 10B, upon enclosing coupling, the base member 22 and the cover panel member 24 cooperatively define a device compartment 237 in which at least a substantial portion of the multimedia system 30 is received.

While the base member 22 and the cover panel member 24 of the housing unit 20 are configured to enclosingly couple each other to define the device compartment for receiving components of the multimedia system 30, a hermetic coupling between the base member 22 and the cover panel member 24 is not necessary. In some embodiments, voids/slots may be arranged between the base member 22 and the cover panel member 24 at selective locations upon coupling to access to components of the multimedia system 30, e.g., for cable/wire routing purposes, to define media insertion ports, and/or to form ventilation/cooling passages. In some embodiments, a gap of suitable width is maintained between the base member 22 and the cover panel member 24 at selective locations for allowing a fabric member of the head support unit 10 to pass there-between. The width of the gap may be generally comparable to a thickness of the fabric material, and in some applications, may be configured to be slight narrower than the thickness thereof to provide additional clamping force thereto, thereby enhancing the fabric tensioning/retaining effect.

Referring collectively to FIGS. 10A, 11A-C, and 12A-F, further detail features of the base member 22 will be discussed as follows. As previously mentioned, the base member 22 may be provided with a mounting seat to accommodate a cooling device (e.g., cooling fan 38 shown in FIG. 5) at a suitable location. In the instant example, the base member 22 comprises a cooling device mounting seat 224 integrally formed on the right peripheral plate portion thereof. The mounting seat 224 may be configured to screwlessly retain the cooling device, e.g., through elastic snap-on retaining mechanisms, or with the help of additional screw fastener(s). While the instant example illustrates the provision of a single mounting seat 224 on the right side of the base member 22, other arrangements may be possible within the scope of the disclosure. As discussed above, in some embodiments, a fan mounting seat may be provided on the bottom peripheral plate portion (e.g., the bottom peripheral panel having a bottom facing surface 222b) of the base member 22 to trigger air flow to the neck area of a seat occupant through a correspondingly configured ventilation/circulation port (e.g., slit 113 shown in FIG. 6A). In some embodiments, a second fan mounting seat may be providing at a substantially diagonal location across the base member 22 to accommodate an additional cooling device. In such an arrangement, the first one of the cooling devices may be configured to suck air into the device compartment, while the second one of the cooling devices being configured to extract air out of the housing unit 20. Such push/pull circulation arrangement may further increase heat removal efficiency of the headrest system.

The base plate portion of the base member 22 (e.g., the base tray panel that defines the inner base surface 221a and the outer base surface 221b, as illustrated in FIG. 11A/B/C) may be provided with an opening/aperture 211 to allow cable passage there-through, thus enabling greater degree of flexibility in the cable organization/management department. The opening/aperture 211 may also serve as a portion of the ventilation/circulation system that helps to define a flow path, and/or further contribute to the overall weight reduction of the headrest system.

Figure 11B:
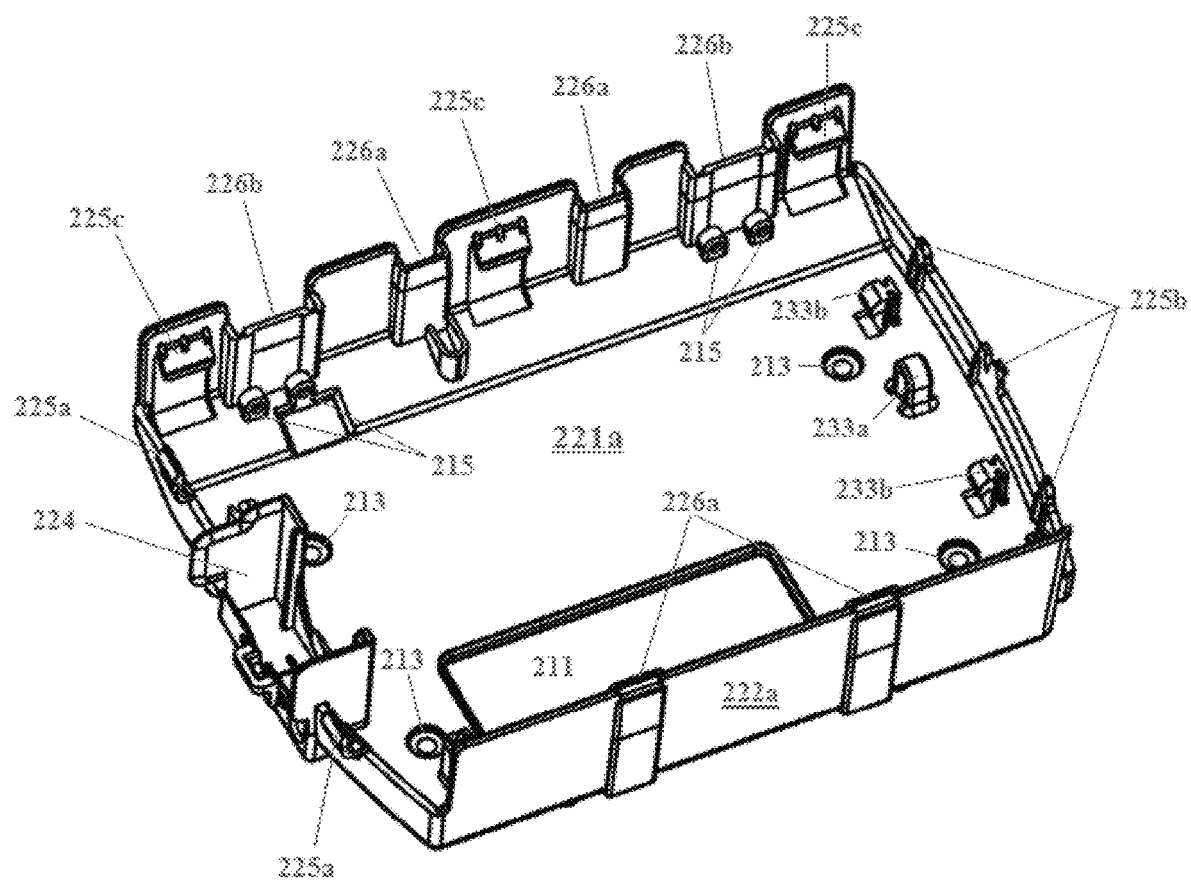

As previously mentioned, the base plate portion of the base member 22 is provided with a plurality of fastener apertures 213 arranged at locations in correspondence with the retaining features 143 of the mounting bracket portion 141. As illustrated in FIGS. 11A-B, the fastener apertures 213 of the instant example are provided in the form of through holes that enable passage from the inner base surface 221a to the outer base surface 221b of the base member 22. In the instant embodiment, each of the fastener apertures 213 allows a fastener (such as a screw or a bolt) to be inserted from the inner base surface 221a and lock onto a corresponding retaining feature (e.g., retaining feature 143 of the mounting bracket portion 141) situated at the outer base surface 221b. Moreover, as visible in FIG. 11C, the outer base surface 221b is provided with a plurality of (in the instant case, four) coupling extensions 227 from which one end of the fastener aperture 213 is exposed. In some embodiments, one end of the fastener aperture 217 may have a wider profile than the other end. For instance, the coupling extension 227 may define a second end of the fastener aperture 217 wider than a first end defined at the inner base surface 221a of the base member 22. The wider aperture profile defined in the coupling extension 227 may allow acceptance of the retaining feature 143 therein, thus providing extra coupling security between the base member 22 and the mounting bracket portion 141 of the head support unit 10. Nevertheless, in some embodiments, a screw-free snap-on arrangement may be utilized in place of the fastener retention scheme, in which releasable coupling mechanisms are provided on the outer base surface 221b of the base member 22 to establish mechanical interference with correspondingly configured retaining features 143 on the mounting bracket portion 141.

Figure 11C:
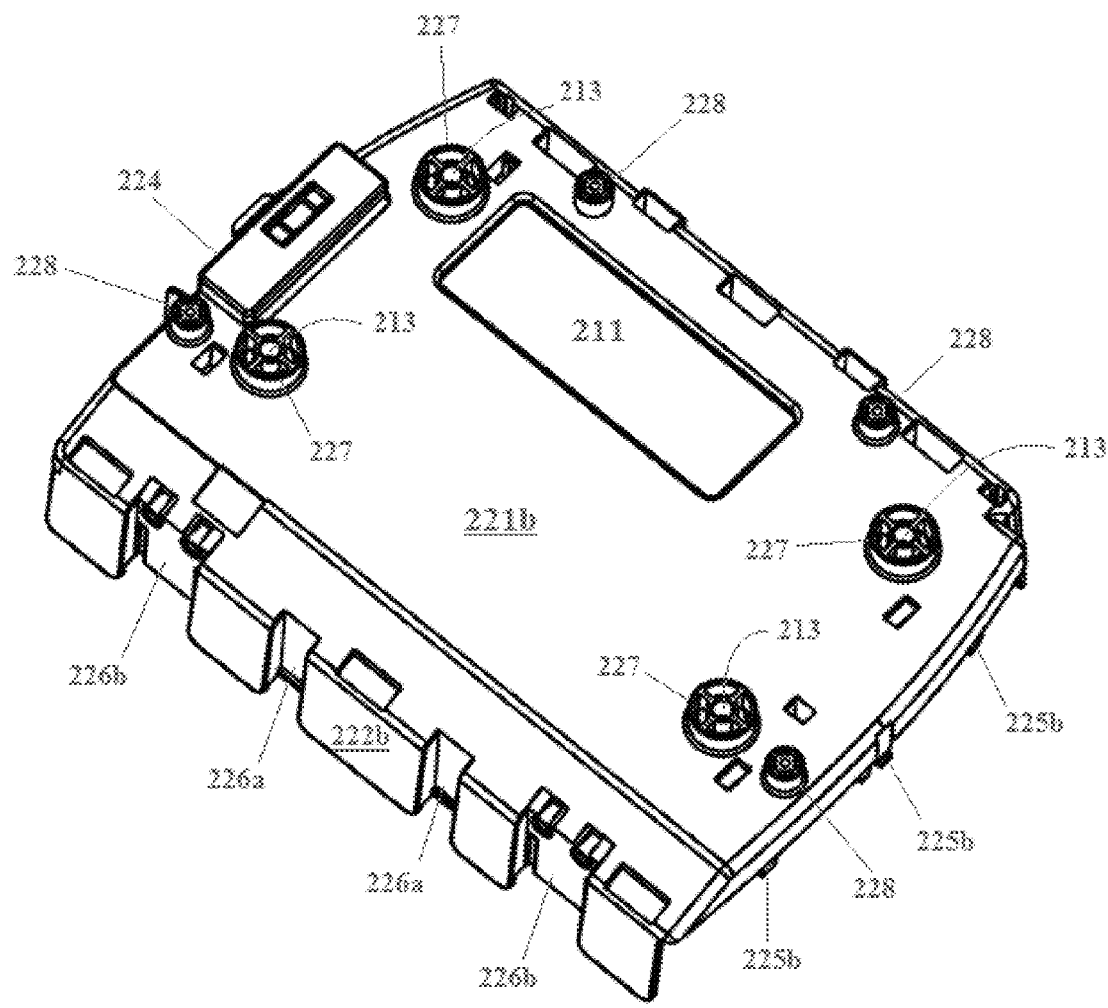
Figure 12A:
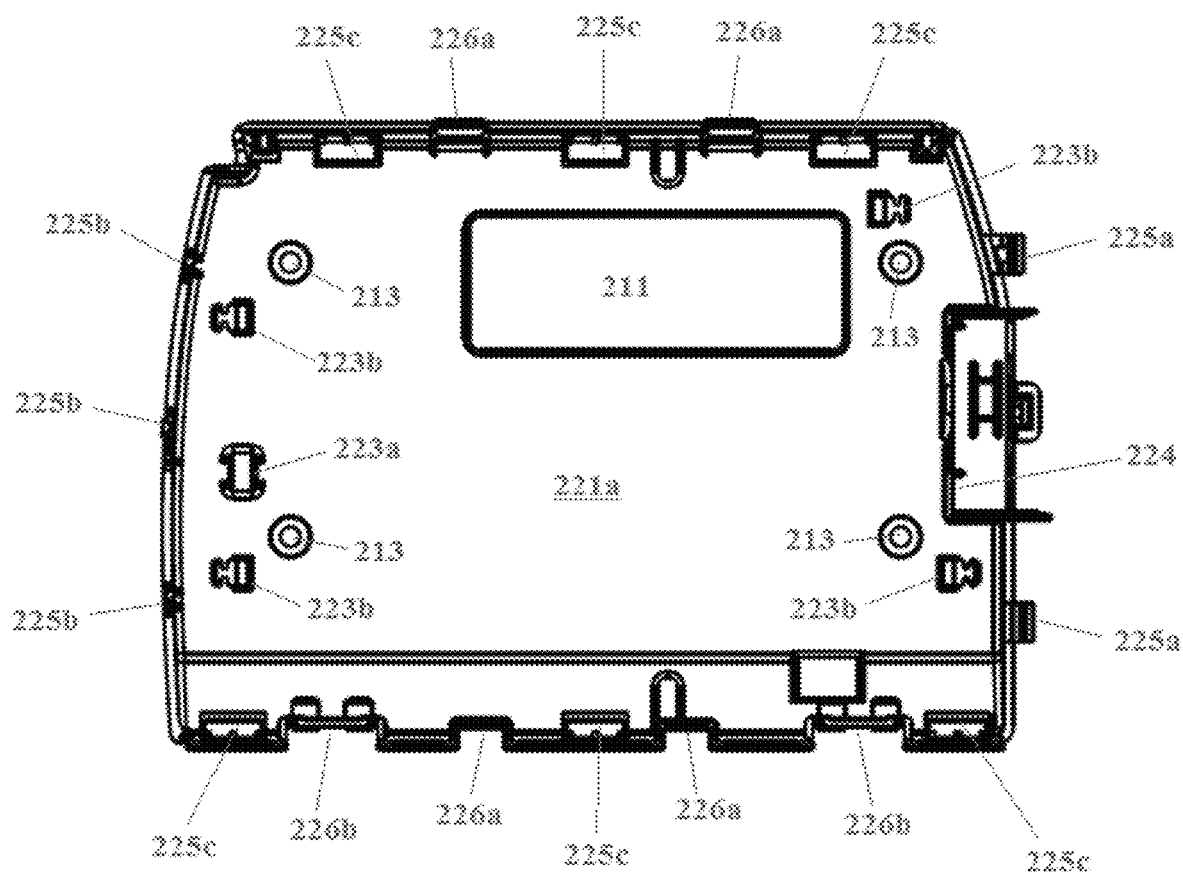
FIGS. 12A-12F are orthographic projections of a base member in accordance with one embodiments of the instant disclosure.
Figure 12B:
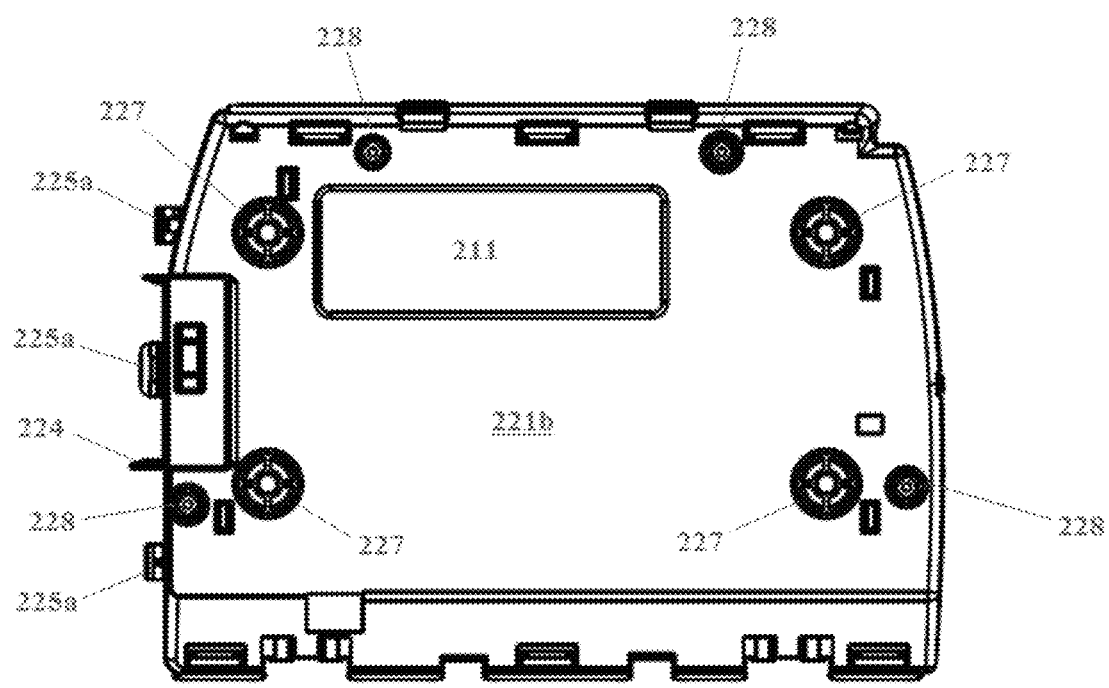
Figure 12C:
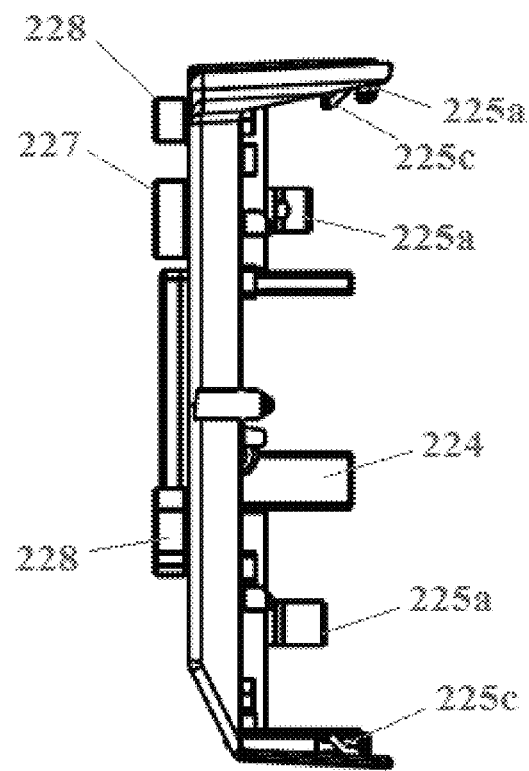
Figure 12D:
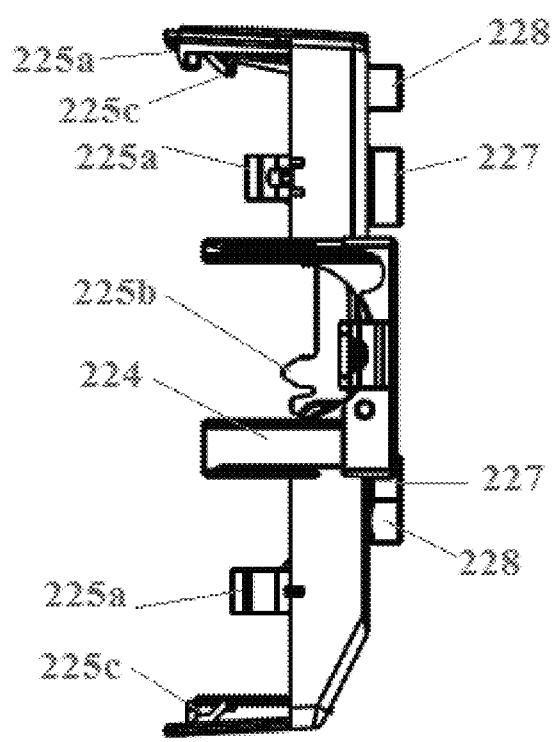
Figure 12E:
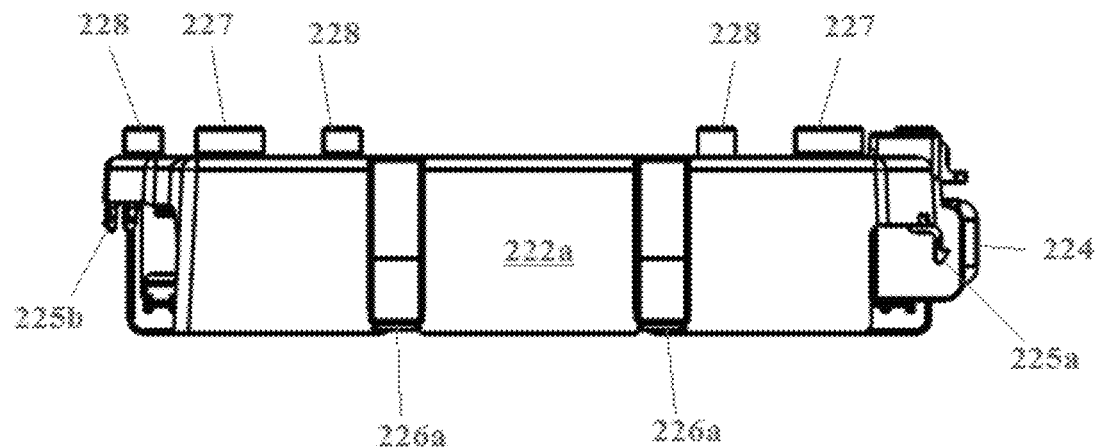
Figure 12F:
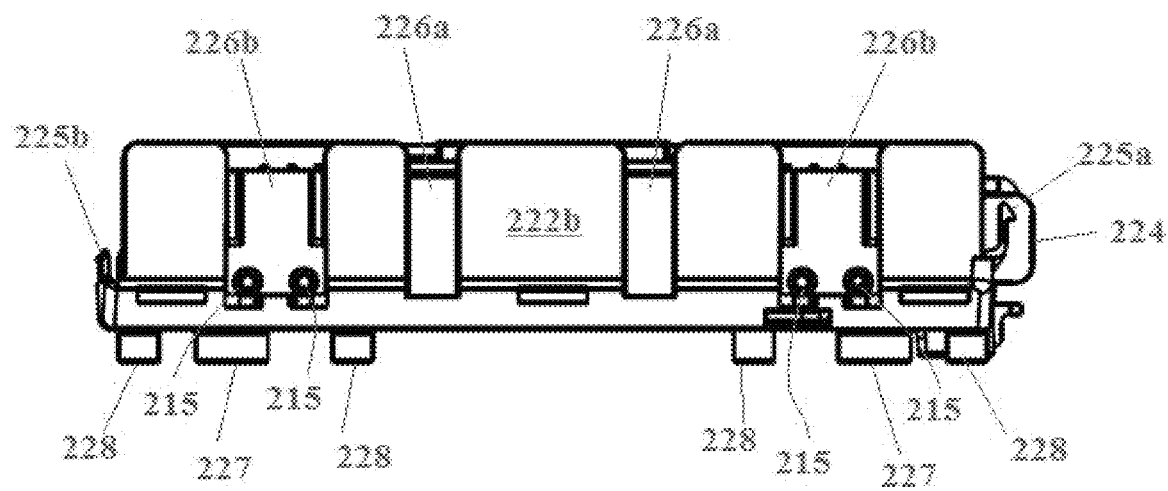

In addition, as illustrated in FIG. 11C, the forward facing surface (e.g., the outer base surface 221b) of the base member 22 is provided with a plurality of spacing extensions 228 configured to maintain a proper mounting distance between the base member 22 and the mounting bracket portion 141 of the head support unit 10. In some embodiments, both of the coupling extension 227 and the spacing extension 228 are formed integrally on the outer base surface 221b, e.g., through molding. Either one (or both) of the coupling extension 227 and the spacing extension 228 may comprise a structurally hollowed body with cut-outs arranged therein. The hollow body may enhance the impact absorbing ability of the extension members. In some embodiments, the coupling extension 227 and/or the spacing extension 228 are provided as external add-on units. In such cases, the add-on extension members 227/228 may be made of shock absorbing materials different from that of the base member 22, such as rubber or high density foam.

Referring to FIGS. 11A/B, the inner base surface 221a of the base member 22 may be provided with mounting features that facilitate proper positioning/retention of the components of the multimedia system 30 thereon. In the illustrated embodiment, the inner base surface 221a of the base member 22 is provided with a cable retaining loop 223a and a plurality of (in this case, four) spacing studs 223b. The cable retaining loop 223a may allow passage of a cable there-under, thereby anchoring a portion the cable at a specific location. The cable retaining loop 223a may be provided at a location proximate a cable connector joint to prevent excessive displacement of the connector, thereby preventing potential signal interruption due to loosen/dislocation of the associated connector joints. In some embodiments, a through hole is provided proximate or between the legs of the cable retaining loop 223a to allow passage of the cable to the other side (e.g., the outer base surface 221b) of the base member 22. Such arrangements may further facilitate cable routing management. For instance, a cable of the multimedia system 30 received in the housing unit 20 may be routed through the hole between the cable retaining loop 223a and subsequently be inserted into the hollow tubular body of the mounting post 142 of the head support unit 10, thus allowing the cable to establish connection with other onboard electronic components through proper routing arrangements provided in the vehicle seat.

The spacing studs 223b may be used to maintain proper mounting distance between components of the multimedia system 30 and the base plate portion of the base member 22. For example, the four spacing studs 223b in the illustrated embodiment may be used to keep a circuit board (e.g., circuit board 34) of the multimedia system 30 a distance away from the inner base surface 221a, thereby creating a gap there-between. Such an arrangement may provide local structural isolation to the multimedia system 30, thus making the electronic components thereof less prone to potential shocks and impacts excreted through the housing unit 20. In some embodiments, the spacing stud 223b may be integrally formed on the inner base surface 221a of the base member 22, e.g., by molding. The spacing stud 223b may comprise a hollowed body with cut-outs provided therein, which may increase flexibility (or, reduce shock transferring there-through) and reduce the structural weight thereof. In some embodiments, the spacing studs 223b are provided as internal add-on units. In such cases, the the add-on stud members 223b may be made of shock absorbing materials different from that of the base member 22, such as rubber or high density foam. In some embodiments, the a rear-facing surface of the spacing stud 233b is provided with a protruding tab (not shown) configured to be inserted into a correspondingly arranged positioning slot arranged on a component (e.g., circuit board 34) of the multimedia system 30, thus further facilitating device alignment/retention within the housing unit 20. Moreover, the gap generated by the spacing studs 223b between the electronic components of the multimedia system 30 and the inner base surface 221a may also serve as part of a air flow passage/channel that contributes to greater head removal efficiency.

Figure 13A:
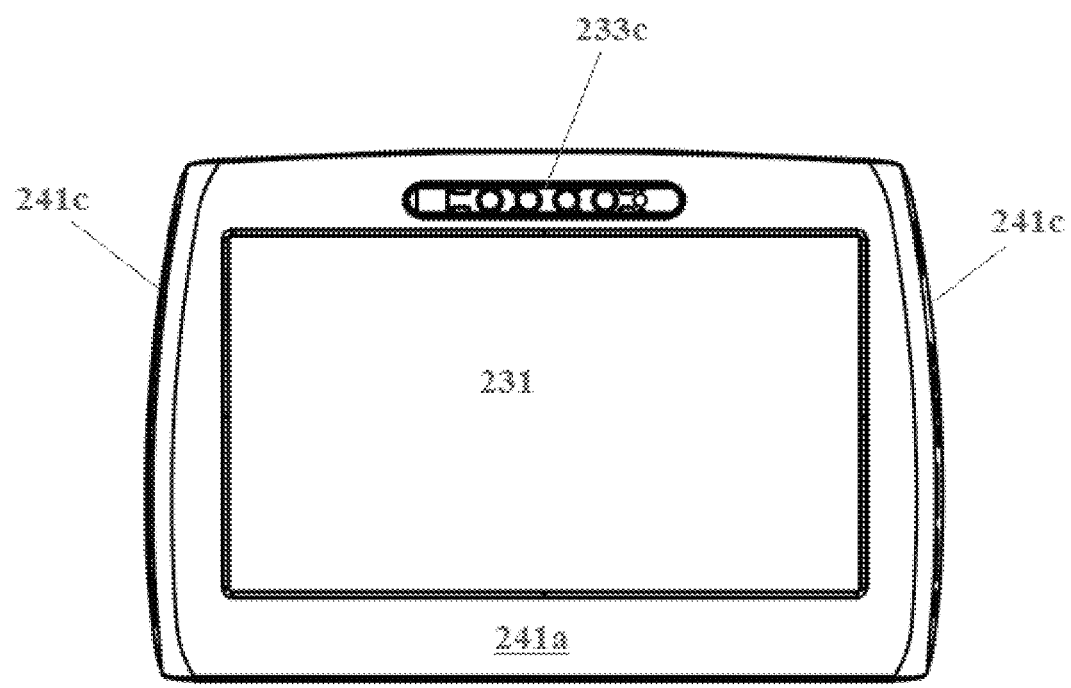
FIGS. 13A-13E are orthographic projections of a cover panel member in accordance with one embodiment of the instant disclosure.
Figure 13B:
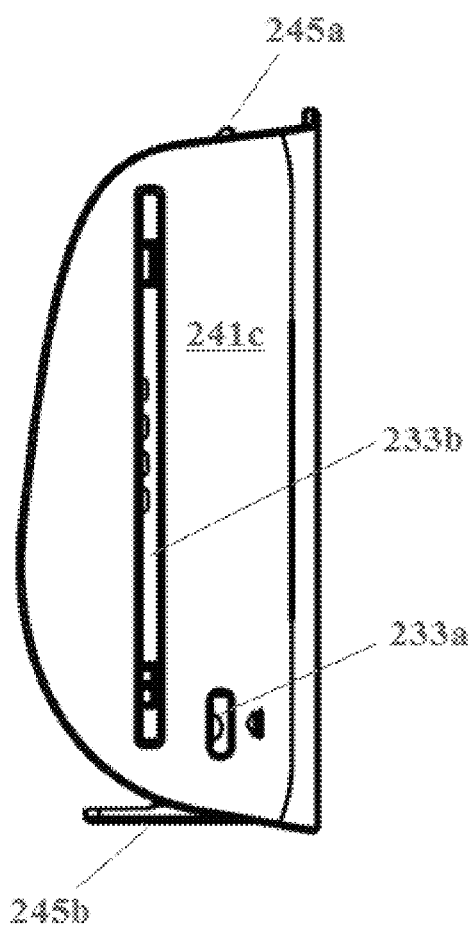
Figure 13C:
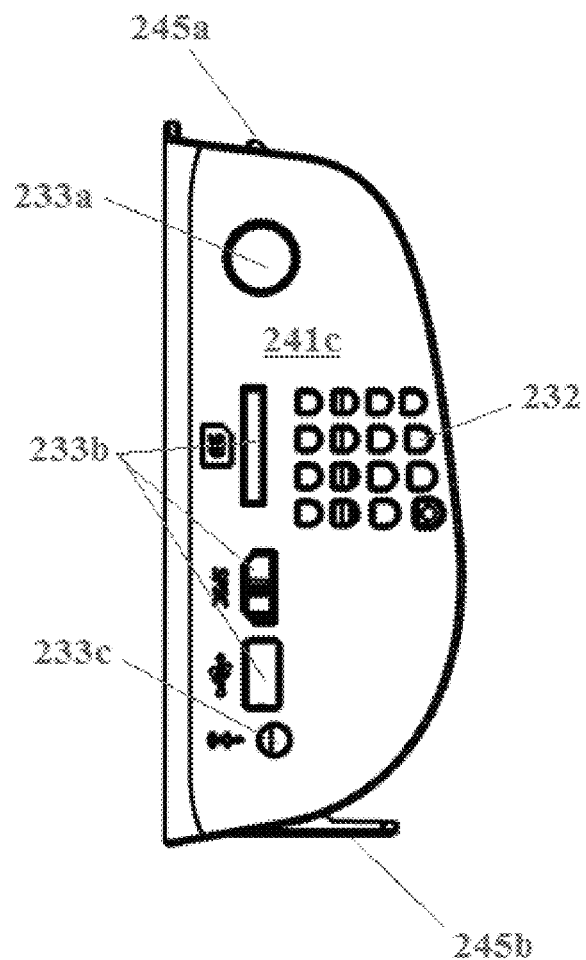
Figure 13D:
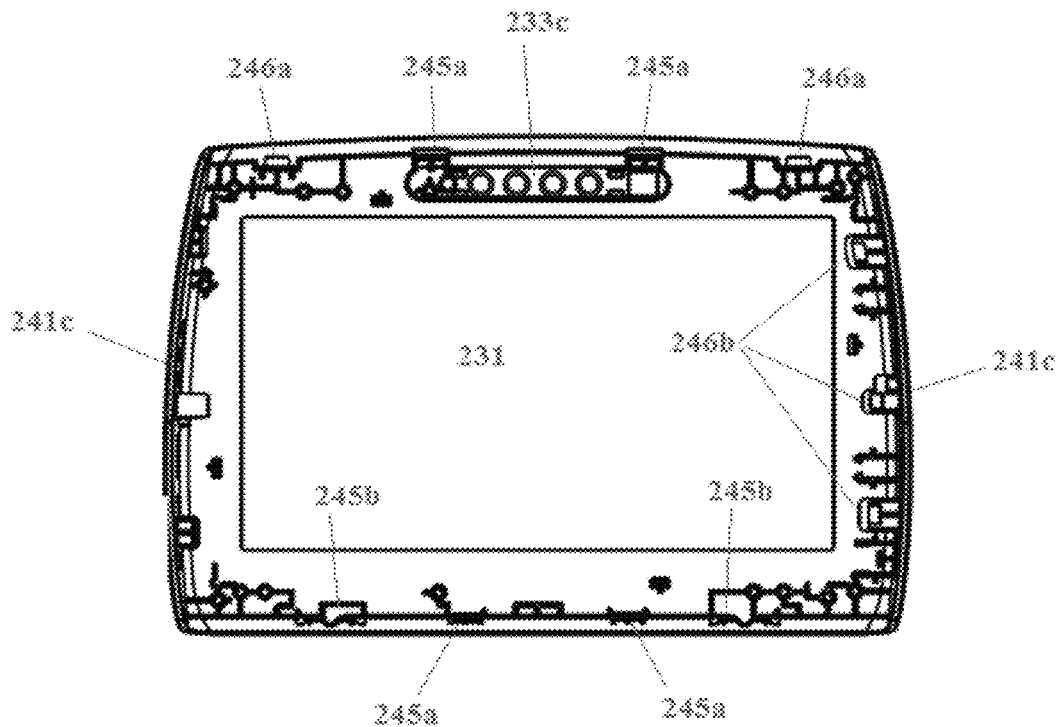
Figure 13E:
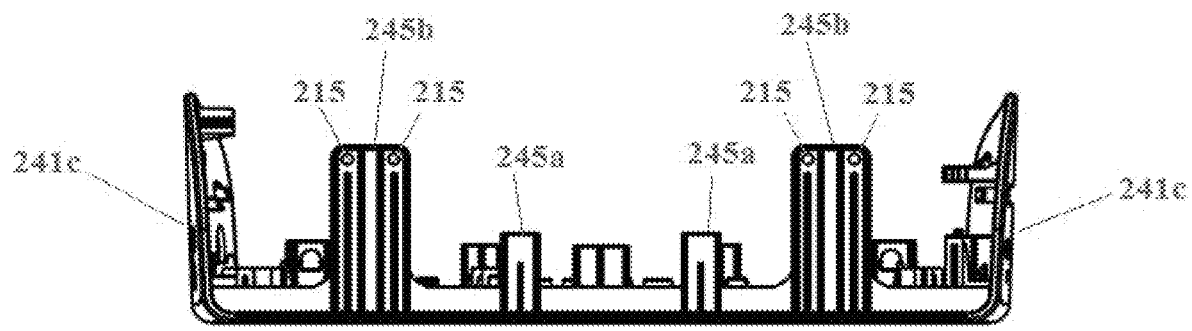

Referring collectively to FIGS. 10A and 13A-E, further detail features of the cover panel member 24 will be discussed as follows. Particularly, the features provided on the panel surfaces of the cover panel unit 24 are more apparently illustrated in these figures. As previously discussed, the panel surfaces of the cover panel member 24 provide convenient locations for housing a variety of device features for easy access to the multimedia system 30. In the illustrated embodiment, the external features on the cover panel unit 24 include a plurality of control bottom ports 233a respectively arranged on the right and left side panels 241c. Each of the control bottom ports 233a is configured to receive and operatively expose one or more control bottom, e.g., a master power bottom 244 on the right side panel and a media ejection bottom on the left side panel (FIG. 13B).

In addition, the illustrated cover panel member 24 includes a plurality of media loading ports 233b provided on the left and right side panels 241c thereof. Particularly, the media loading ports include a DVD disc loading port having a narrow slit profile arranged on the left side panel. The media loading ports 233b of the exemplary embodiment further include a flash card loading port, a SD card loading port, and an USB interface provided on the right side panel. Media interface of other formats may also be provided, depending on specific application requirements.

Moreover, one or more signal access ports 233c are provided on the side panel 241c to enable signal input/output to/from the multimedia system 30. Particularly, the illustrated embodiment comprises a signal access port 233c having the form of an audio signal access port (e.g., an ear phone connector jack) arranged on the right side panel 241c to enable audio signal access to the multimedia system 30. In addition, another signal access port 233c taking the form of a wireless signal window is arranged above the viewing window 231 on the rearward facing panel 241a for enabling emission/reception of wireless signals. For instance, the wireless signal window may allow transceiver components of the multimedia system 30 to issue/receive wireless signals there-through. The wireless signals may include short range infrared signals for remote controlling purposes. The wireless signal window may also allow transmission of other forms of radio signals to/from the multimedia system 30 for establishing short range inter-device communications (e.g., irDA infrared data communication or the like). A shielding member 247 is provided to protect the sensitive components housed behind the wireless signal window/signal access port 233c. The shielding member 247 need not be optically transparent, as long as it sufficiently allows transmittance of the wireless signal there-through. In some embodiments, one or more optical illuminator (e.g., optical light emitting diode/LED) is housed in the wireless signal window to provide night time illumination for an onboard passenger. In such cases, an optically transparent shielding member 247 may be utilized.

In some embodiments, additional functional features may be incorporated on the panel cover unit 24 to expand the accessibility and/or functionality of the headrest system, depending on specific application requirements. For example, additional media loading ports 233b and/or signal access ports 233c may be provided to communicate video/audio, or other forms of media signals from/to the multimedia system 30. In some embodiments, a video signal ports such as a HDMI port is accessibly incorporated through the cover panel member 24 to enable high quality audiovisual in/outputs to/from the multimedia system 30. In some embodiments, a signal access port conforming to the connector standard of a particular personal mobile device (e.g., Apple's 8-pin or 30-pin connectors) is accessibly provided on a suitable location of the cover panel member 24 to enable wired connectivity between the multimedia system 30 and a personal multimedia gadget, such as a mobile phone, tablet, iPOD, iPAD, or iPhone.

Figure 14:
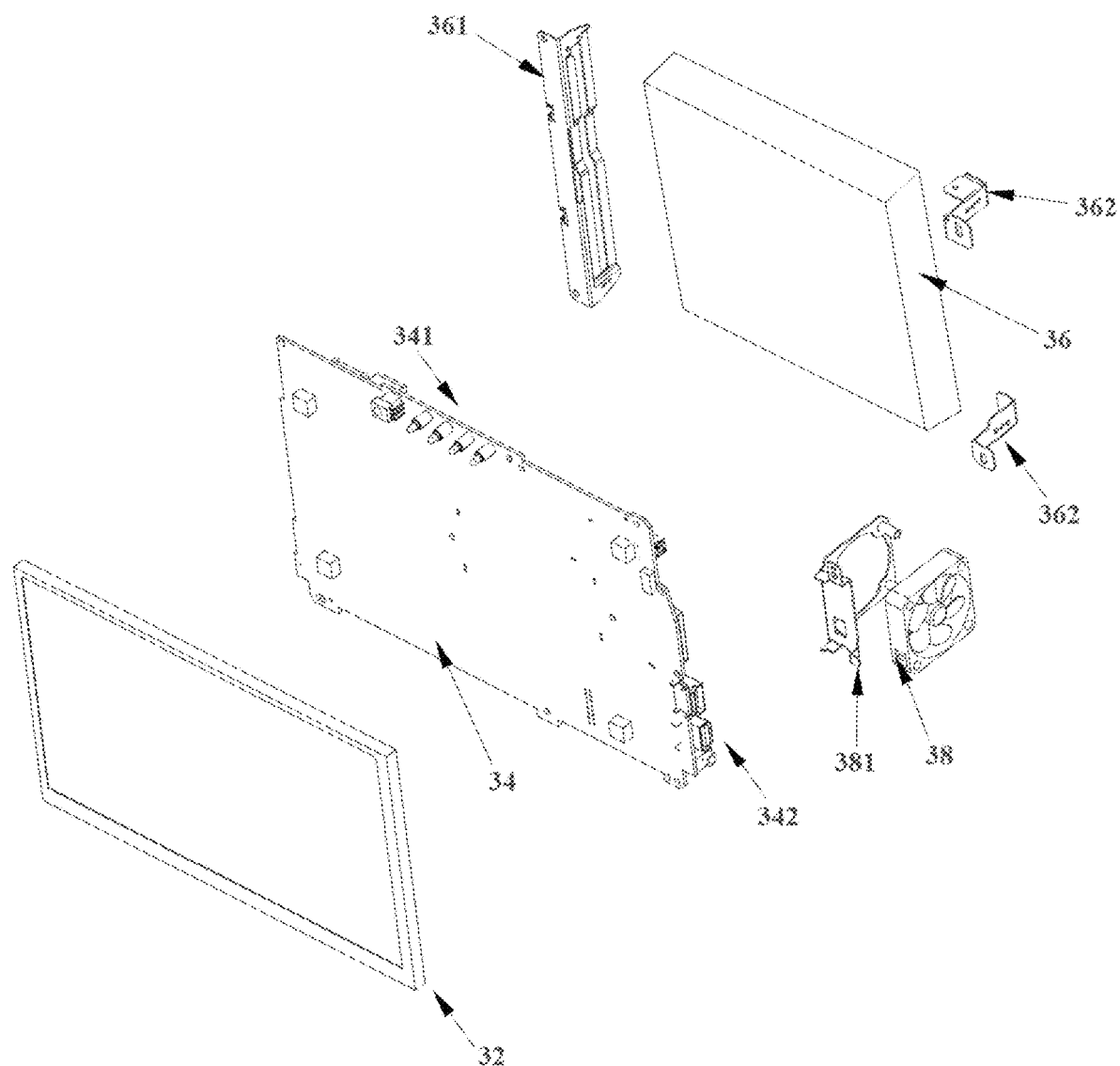
FIG. 14 is an isometric illustration of components of a multimedia system in accordance with one embodiment of the instant disclosure.

FIG. 14 is an isometric illustration of the components of a multimedia system in accordance with one embodiment of the instant disclosure. Particularly, the illustrated multimedia system 30 comprises a display unit 32, a circuit board 34, a media source device 36, and a cooling device 38. The multimedia system 30 may be of modular design, in which individual components may be provided as functionally stand-alone modules that can be easily swapped on and off the circuit board 34. For example, in some embodiments, the display unit 32 and the media source device 36 may be configured to establish signal communication with the circuit board 34 through detachable connectors rather than permanent fixation arrangements (such as through solders), thus allowing them to be easily decoupled for service or replacement.

The following description is provided with orientation references made to a seat on which the exemplary headrest-integrated multimedia system is mounted. For instance, the screen surface of the display unit 32 is generally orientated toward a rear side of the seat.

In the instant embodiment, the display unit 32 comprises a flat screen touch-sensitive device, configured to be substantially rigidly coupled to a rear-facing surface of the circuit board 34. Moreover, the display unit 32 is adapted to be mounted at a substantially fixed/non-pivotal manner with respect to the housing unit 20 and the headrest unit in general. As discussed previously, such a fixed relative position with respect to the headrest unit helps to ensure secured and predictable finger operations on the surface of the display unit 32.

The circuit board 34 provides a backbone structure for housing the necessary electronic components, e.g., processing units and component interfaces (not specifically shown) to enable device integration of the multimedia system 30. Visible from FIG. 14, the exemplary circuit board 34 further comprises an optical wireless transmission unit 341 arranged at an upper edge region of its backward-facing surface. The optical wireless transmission unit 341 is positioned substantially in alignment with the wireless signal window/signal access port 233c provided on the rearward facing panel 241a of the cover panel member 24 upon coupling. Also visible from the instant view are the plurality of connector sockets 342 arranged at the lower right edge region of the circuit board 34. Likewise, the connector sockets 342 are arranged in correspondence with the positions of the media access ports 233b or the signal access ports 233c on the cover panel member 24 upon coupling. In some embodiments, the circuit board 34 is further equipped with additional onboard wireless modules capable of establishing communications in conformance with various communication protocols, including Blue Tooth, WiMax, Wifi, 3/4G communication protocols or the like.

The media source device 36, in the instant case a DVD player, is provided on the forward-facing side of the circuit board 34. In the illustrated embodiment, one or more mounting members 361/362 are employed to securely couple the DVD player to the circuit board 34. Particularly, the larger one of the mounting members (i.e., member 362) is provided with a long narrow slit to enable passage of an optical disc there-through. Other coupling/retaining arrangements may also be adopted.

The cooling device 38 is configured to be coupled to the circuit board 34 at the right side edge portion thereof. In the instant embodiment, a bracket member 381 is employed to provide structural retention between the cooling device 38 and the circuit board 34. In other embodiments, the cooling device 38 may be structurally coupled to places other than the circuit board 34, e.g., coupled to the cooling device mounting seat 224 of the base member 22. Nevertheless, the location and the orientation of the cooling device 38 need not be limited to that illustrated in the instant example, as long as the cooling device 38 is orientated in correspondence with the venting/circulation features arranged on the housing member 20.

Figure 15A:
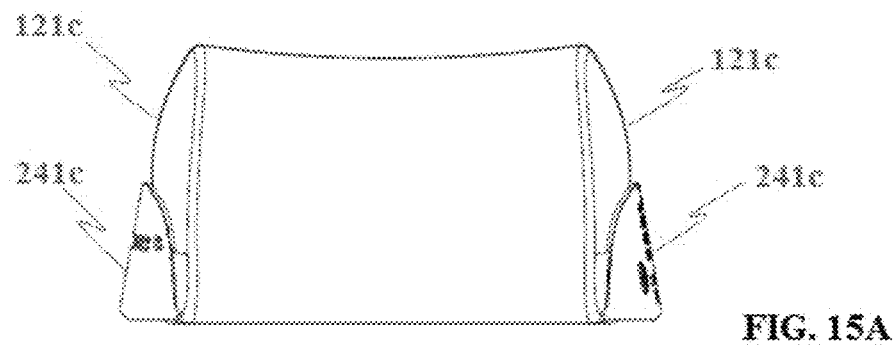
FIG. 15A-C are plan views of exemplary headrest integrated multimedia systems in accordance with embodiments of the instant disclosure.
Figure 15B:
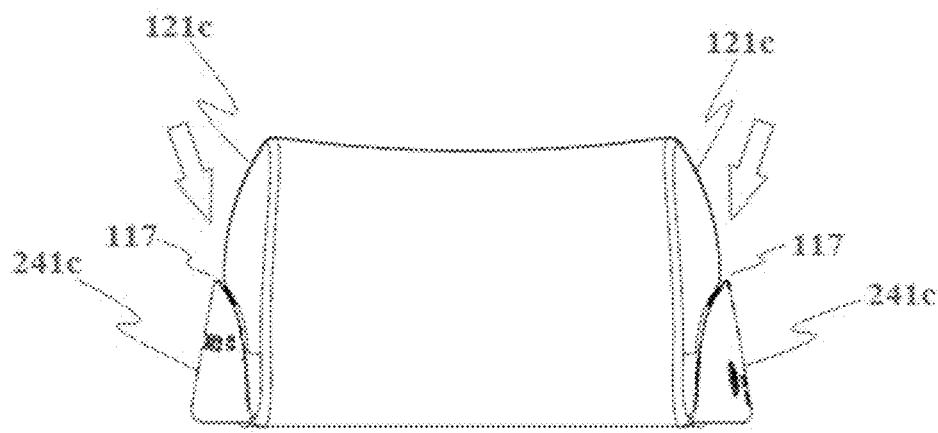
Figure 15C:
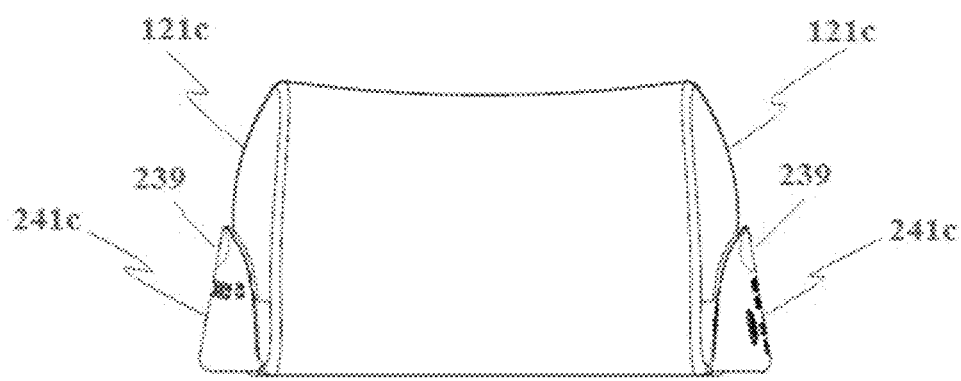

FIG. 15A-C are plan views of exemplary headrest integrated multimedia systems in accordance with embodiments of the instant disclosure. As discussed previously, further structural arrangements and functional features may be incorporated into the design of the instantly disclosed headrest integrated entertainment system to expand the functionality and user friendliness thereof.

Particularly, FIG. 15A shows an exemplary headrest system utilizing a cover panel member having side panels 241c wider than the width of the head support unit. Specifically, the side panels 241c of the instant embodiment comprises a flare-out profile that widens toward the rear side of the headrest unit, at an angle of approximately 15 degrees. Other flare-out arrangements may be employed within the scope of the instant disclosure, so long as the joining interface between the lateral side surface 121c and the side panel 241c is rounded to touch and sufficiently smooth to prevent scratch and cut to an occupant's body parts.

On the other hand, FIG. 15B shows an exemplary headrest system having a pair of forward-facing ventilation slit 117. Specifically, the joining interface between the head support unit and the housing unit is configured in such a way that the slit 117 is formed between the lateral side surface 121c and the side panel 241c. The forward-facing ventilation slits 117 may provide an alternative form of cooling intake (or exhaust) that facilitate the egress of heat from the housing unit. The ventilation slits 117 may further serve as part of a built-in headrest circulator/refresher capable of generating airflow around the head/cheek region of a seat occupant, as discussed above.

Last but not least, FIG. 15C shows an exemplary headrest system having additional ergonomic enhancement features provided on the side panels 241c thereof. Specifically, a plurality of finger grooves 239 are provided on the side panel 241c proximate its joining interface with the lateral side surfaces to provide additional comfort for a user. The finger grooves 239 may be curved depression formed on the surface of the side panel 241c, e.g., through molding. The flare-out structure of the exemplary cover panel member may provide an enlarged gripping surface for the palm of a user. Accordingly, the finger grooves 239 may be placed and shaped in correspondence with the fingers of a human hand, e.g., to allow the establishment of firmer grip onto the headrest system while operating the touch-sensitive display unit. Moreover, the depressed surface of the finger groove (and/or other selective location on the side panel 241c) may be textured to increase friction, thereby enhancing gripping level for a device operator.

Reference throughout this specification to "one embodiment" or "an embodiment" means that a particular feature, structure or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures or characteristics of any embodiment described above may be combined in any suitable manner, as would be apparent to one of ordinary skill in the art from this disclosure, in one or more embodiments.

Similarly, it should be appreciated that in the above description of embodiments, various features of the inventions are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that any claim require more features than are expressly recited in that claim. Rather, as the following claims reflect, inventive aspects lie in a combination of fewer than all features of any single foregoing disclosed embodiment. Thus, the claims following the Detailed Description are hereby expressly incorporated into this Detailed Description, with each claim standing on its own as a separate embodiment. This disclosure includes all permutations of the independent claims with their dependent claims.

What is claimed is:

1. A headrest integrated entertainment system for a vehicle seat, comprising:
   a head support unit adapted to be coupled to the seat of a vehicle;
   a base member adapted to be securely coupled to the head support unit;
   a cover panel member configured to enclosingly couple the base member to define a device compartment there-between,
   wherein the base member and the cover panel member are securely coupled to each other through a plurality of integrally formed buckle units respectively distributed thereon; and
   a multimedia system including a display device observably retained in the device compartment.

2. The system of claim 1, wherein the cover panel member comprises a side panel that is at least partially exposed from the head support unit, the multimedia system is arranged accessibly and operably in the device compartment through the side panel.

3. The system of claim 2, wherein the cover panel member comprises a rearward facing panel having a viewing window defined therein for visually exposing the display device toward a rear side of the seat,
   wherein the rearward facing panel traverses substantially across a width of the head support unit,
   wherein the side panel integrally extends from the rearward facing panel.

4. The system of claim 3, wherein the head support unit comprises a pillow portion defining a head support surface facing toward a front side of the seat when the head support unit is coupled to the seat, and at least a lateral side surface extending substantially horizontally from the head support surface; and
   a support portion coupled to the pillow portion and configured to support the head support unit on the seat,
   wherein the base member is adapted to be securely mounted on the support portion.

5. The system of claim 4, wherein the side panel and the lateral side surface cooperatively define a substantially integral lateral headrest surface.

6. The system of claim 5, wherein the side panel is configured to be substantially flush with the lateral side surface.

7. The system of claim 5, wherein the side panel is arranged at least partially wider than the lateral side surface, and the side panel and the lateral side surface cooperatively define a cooling intake slit there-between.

8. The system of claim 4, wherein the pillow portion defines a recess structure facing substantially toward a rear side of the seat when the head support unit is coupled to the seat, and the support portion is arranged substantially in the recess structure.

9. The system of claim 8, wherein the lateral side surface of the pillow portion comprises substantially a crescent profile having a concavity thereof facing substantially toward the rear side of the seat when the head support unit is coupled to the seat.

10. The system of claim 9, wherein the side panel comprises substantially a forward facing convex configured to correspondingly match the concavity of the lateral side surface of the pillow portion.

11. The system of claim 2, wherein the side panel is provided with a control interface through which the multimedia system is operable.

12. The system of claim 11, wherein the control interface comprises at least one of a power key, a display adjustment, an audio adjustment, a signal source adjustment, and a media ejection key.

13. The system of claim 1, wherein each of the buckle units includes a pair of engaging members and a receptacle member configured to correspondingly and snugly mate with each other, and the engaging members and the receptacle members are selectively and correspondingly arranged on the cover panel member and the base member.

14. The system of claim 13, wherein at least a portion of the engaging members comprise a projection structure that extends toward a corresponding one of the receptacle member.

15. A headrest integrated entertainment system, comprising:
a head support unit adapted to be coupled to a seat of a vehicle; and
an entertainment module adapted to be integrally coupled to the head support unit, comprising:
a housing unit defining a device compartment and comprising a side panel, wherein the side panel is at least partially exposed from the head support unit upon integral coupling of the entertainment module and the head support unit, and
a multimedia system arranged accessibly and operably in the device compartment through the side panel, the multimedia system comprising a display device observably retained at a substantially fixed angle with respect to the housing unit,
wherein the housing unit comprises:
a rearward facing panel having a viewing window defined therein for visually exposing at least a portion of the multimedia system toward a rear side of the seat,
wherein the rearward facing panel traverses substantially across a width of the head support unit, and wherein the side panel integrally extends from the rearward facing panel.

16. The system of claim 15, wherein the display device is a touch-sensitive device.

17. The system of claim 15, wherein the head support unit comprises:
a pillow portion defining a head support surface facing toward a front side of the seat when the head support unit is coupled to the seat, and at least a lateral side surface extending substantially horizontally from the head support surface; and
a support portion coupled to the pillow portion and configured to support the head support unit on the seat.

18. The system of claim 17, wherein the side panel and the lateral side surface cooperatively define a substantially integral lateral headrest surface.

19. The system of claim 18, wherein the side panel is arranged at least partially wider than the lateral side surface, and the side panel and the lateral side surface cooperatively define a cooling intake slit there-between.

20. The system of claim 18, wherein the side panel is configured to be substantially flush with the lateral side surface.

21. The system of claim 17, wherein the pillow portion defines a recess structure facing substantially toward a rear side of the seat when the head support unit is coupled to the seat, and the support portion is arranged substantially in the recess structure.

22. The system of claim 21, wherein the lateral side surface of the pillow portion comprises substantially a crescent profile having a concavity thereof facing substantially toward the rear side of the seat.

23. The system of claim 22, wherein the side panel comprises substantially a forward facing convex profile configured to correspondingly match the concavity of the lateral side surface of the pillow portion.

24. The system of claim 15, wherein the side panel is provided with a control interface through which the multimedia system is operable.

25. The system of claim 24, wherein the control interface comprises at least one of a power key, a display adjustment, an audio adjustment, a signal source adjustment, and a media ejection key.

26. The system of claim 15 further comprising:
a housing member,
wherein the housing member further comprises:
a base member adapted to be coupled to the head support unit, and a cover panel member that includes the rearward facing panel and the side panel configured to enclosingly couple the base member.

27. The system of claim 26, wherein the base member and the cover panel member are securely coupled through substantially screw-less arrangement.

28. The system of claim 27, wherein the housing member comprises a plurality of buckle units, each of the buckle units includes a pair of engaging members and a receptacle member configured to correspondingly and snugly mate with each other, and the engaging members and the receptacle members are selectively and correspondingly arranged on the cover panel member and the base member.

29. The system of claim 28, wherein the corresponding pair of engaging member and receptacle member of the buckle unit is integrally and respectively formed on the selective one of the cover panel member and the base member.

30. The system of claim 29, wherein at least a portion of the engaging members comprise a projection structure that extends toward a corresponding one of the receptacle member.

31. A headrest integrated entertainment system, comprising:
a head support unit adapted to be coupled to a seat of a vehicle;
a housing member; and
an entertainment module adapted to be integrally coupled to the head support unit, comprising:
a housing unit defining a device compartment and comprising a side panel, and a multimedia system arranged accessibly and operably in the device compartment through the side panel,
wherein the side panel is at least partially exposed from the head support unit upon integral coupling of the entertainment module and the head support unit, wherein the side panel is provided with a control interface through which the multimedia system is operable, wherein the housing unit comprises:

a rearward facing panel having a viewing window defined therein for visually exposing at least a portion of the multimedia system toward a rear side of the seat, wherein the rearward facing panel traverses substantially across a width of the head support unit, wherein the side panel integrally extends from the rearward facing panel, wherein the housing member comprises:

a base member adapted to be coupled to the head support unit, and a cover panel member that includes the rearward facing panel and the side panel configured to enclosingly couple the base member.

32. The system of claim 31, wherein the head support unit comprises:

a pillow portion defining a head support surface facing toward a front side of the seat when the head support unit is coupled to the seat, and at least a lateral side surface extending substantially horizontally from the head support surface; and a support portion coupled to the pillow portion and configured to support the head support unit on the seat.

33. The system of claim 32, wherein the side panel and the lateral side surface cooperatively define a substantially integral lateral headrest surface.

34. The system of claim 33, wherein the side panel is configured to be substantially flush with the lateral side surface.

35. The system of claim 33, wherein the side panel is arranged at least partially wider than the lateral side surface, and the side panel and the lateral side surface cooperatively define a cooling intake slit there-between.

36. The system of claim 32, wherein:

the pillow portion defines a recess structure facing substantially toward a rear side of the seat when the head support unit is coupled to the seat, the support portion is arranged substantially in the recess structure.

37. The system of claim 36, wherein the lateral side surface of the pillow portion comprises substantially a crescent profile having a concavity thereof facing substantially toward the rear side of the seat.

38. The system of claim 37, wherein the side panel comprises substantially a forward facing convex profile configured to correspondingly match the concavity of the lateral side surface of the pillow portion.

39. The system of claim 31, wherein the control interface comprises at least one of a power key, a display adjustment, an audio adjustment, a signal source adjustment, and a media ejection key.

40. The system of claim 31, wherein the base member and the cover panel member are securely coupled through substantially screw-less arrangement.

41. The system of claim 40, wherein the housing member comprises a plurality of buckle units, each of the buckle units includes an pair of engaging member and receptacle member configured to correspondingly and snugly mate with each other, and the engaging members and the receptacle members are selectively and correspondingly arranged on the cover panel member and the base member.

42. The system of claim 41, wherein the corresponding pair of engaging member and receptacle member of the buckle unit is integrally and respectively formed on the selective one of the cover panel member and the base member.

43. The system of claim 42, wherein at least a portion of the engaging members comprise a projection structure that extends toward a corresponding one of the receptacle member.

* * * * *